United States Patent
Subramanian et al.

(10) Patent No.: US 12,509,663 B2
(45) Date of Patent: Dec. 30, 2025

(54) METHODS AND SYSTEMS FOR ESTIMATING PROPORTION OF FILLED VIRUS CAPSIDS USING CRYO-EM

(71) Applicant: THE PENN STATE RESEARCH FOUNDATION, University Park, PA (US)

(72) Inventors: Suriyasri Subramanian, State College, PA (US); Susan Lynette Hafenstein, Lemont, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 336 days.

(21) Appl. No.: 17/637,445

(22) PCT Filed: Aug. 21, 2020

(86) PCT No.: PCT/US2020/047388
§ 371 (c)(1),
(2) Date: Feb. 22, 2022

(87) PCT Pub. No.: WO2021/041205
PCT Pub. Date: Mar. 4, 2021

(65) Prior Publication Data
US 2022/0283077 A1    Sep. 8, 2022

Related U.S. Application Data

(60) Provisional application No. 62/891,165, filed on Aug. 23, 2019.

(51) Int. Cl.
*C12N 7/00* (2006.01)
*G01N 1/42* (2006.01)
(Continued)

(52) U.S. Cl.
CPC ........... *C12N 7/00* (2013.01); *G01N 15/1468* (2013.01); *C12N 2750/14151* (2013.01);
(Continued)

(58) Field of Classification Search
None
See application file for complete search history.

(56) References Cited

U.S. PATENT DOCUMENTS

| 3,973,725 A | * | 8/1976 | Watanabe | G16H 10/40 |
| | | | | 702/26 |
| 2009/0228215 A1 | | 9/2009 | Moriya | |
| 2012/0244524 A1 | * | 9/2012 | Homman | C12Q 1/686 |
| | | | | 435/5 |

FOREIGN PATENT DOCUMENTS

| CA | 2079924 A1 | 4/1993 | |
| WO | 2014145983 A1 | 9/2014 | |
| WO | WO-2018108926 A1 * | 6/2018 | G06K 9/00208 |

OTHER PUBLICATIONS

Shekunov, B.Y., Chattopadhyay, P., Tong, H.H.Y. et al. Particle Size Analysis in Pharmaceutics: Principles, Methods and Applications. Pharm Res 24, 203-227 (2007). https://doi.org/10.1007/s11095-006-9146-7 (Year: 2006).*

(Continued)

*Primary Examiner* — Matthew G Marini
(74) *Attorney, Agent, or Firm* — Quarles & Brady LLP

(57) ABSTRACT

A method of estimating a proportion of particles filled with material. The method includes: obtaining an image depicting a plurality of particles; generating a plurality of classes based on the plurality of particles; identifying at least one of the plurality of classes having a central portion with a greater density than a central portion of at least one other of the classes; and estimating a proportion of the plurality of (Continued)

particles that are filled with material based on identifying at least one of the classes having a central portion with high density.

19 Claims, 22 Drawing Sheets

(51) Int. Cl.
 G01N 15/00 (2024.01)
 G01N 15/14 (2024.01)
(52) U.S. Cl.
 CPC ....... *G01N 1/42* (2013.01); *G01N 2015/0038* (2013.01); *G01N 2015/1486* (2013.01)

(56) References Cited

OTHER PUBLICATIONS

Salzman, D., A Method of General Moments for Orienting 2D Projections of Unknown 3D Objects, Computer Vision, Graphics, and Image Processing, 1990, 50(2):129-156.
Scheres, S. et al., Maximum-likelihood Multi-reference Refinement for Electron Microscopy Images, Journal of Molecular Biology, 2005, 348(1):139-149.
Scheres, S. et al., Disentangling Conformational States of Macromolecules in 3D-EM through Likelihood Optimization, Nature Methods, 2007, 4(1):27-29.
Scheres, S., Semi-automated Selection of cryo-EM Particles in RELION-1.3, Journal of Structural Biology, 2015, 189(2):114-122.
Schnodt, M. et al., Improving the Quality of Adeno-Associated Viral Vector Preparations: The Challenge of Product-Related Impurities, Human Gene Therapy Methods, 2017, 28(3):101-108.
Shaikh, T. et al., SPIDER Image Processing for Single-particle Reconstruction of Biological Macromolecules from Electron Micrographs, Nature Protocols, 2008, 3(12):1941-1974.
Sigworth, Principles of cryo-EM Single-particle Image Processing, Journal of Electron Microscopy, 2015, 65(1):57-67.
Sommer, J. et al., Quantification of Adeno-associated Virus Particles and Empty Capsids by Optical Density Measurement, Molecular Therapy, 2003, 7(1):122-128.
Steinbach, S. et al., Assembly of Adeno-associated Virus Type 2 Capsids in vitro, Journal of General Virology, 1997, 78(6):1453-1462.
Strobel, B. et al., Comparative Analysis of Cesium Chloride- and Iodixanol-Based Purification of Recombinant Adeno-Associated Viral Vectors for Preclinical Applications, Human Gene Therapy Methods, 2015, 26(4):147-157.
Tang, G. et al., EMAN2: An Extensible Image Processing Suite for Electron Microscopy, Journal of Structural Biology, 2007, 157(1):38-46.
Urabe, M. et al., Removal of Empty Capsids from Type 1 Adeno-associated Virus Vector Stocks by Anion-exchange Chromatography Potentiates Transgene Expression, Molecular Therapy, 2006, 13(4):823-828.
Wang, F. et al., A Reliable and Feasible qPCR Strategy for Titrating AAV Vectors, Medical Science Monitor Basic Research, 2013, 19:187-193.
Weick, E. et al., Helicase-dependent RNA Decay Illuminated by a cryo-EM Structure of a Human Nuclear RNA Exosome-MTR4 Complex, Cell, 2018, 173(7):1663-1677.
Xia, S. et al., Mechanism of TRPM 2 Channel Gating Revealed by cryo-EM, FEBS Journal, 2019, 286(17):3333-3339.
Yan, Z. et al., Inverted Terminal Repeat Sequences are Important for Intermolecular Recombination and Circularization of Adeno-associated Virus Genomes, Journal of Virology, 2005, 79(1):364-379.
Yoon-Robarts, M. et al., Residues within the B' Motif are Critical for DNA Binding by the Superfamily 3 Helicase Rep40 of Adeno-associated Virus Type 2, Journal of Biological Chemistry, 2004, 279(48):50472-50481.
Yuan, W. et al., Canine Parvovirus Capsid Assembly and Differences in Mammalian and Insect Cells, Virology, 2001, 279(2):546-557.
Zeltner, N. et al., Near-perfect Infectivity of Wild-type AAV as Benchmark for Infectivity of Recombinant AAV Vectors, Gene Therapy, 2010, 17(7):872-879.
Zhang, K., Gctf: Real-time CTF Determination and Correction, Journal of Structural Biology, 2016, 193(1):1-12.
Zhang, K. et al., Cryo-EM Structures of Helicobacter Pylori Vacuolating Cytotoxin A Oligomeric Assemblies at Near-atomic Resolution, Proceedings of the National Academy of Sciences, 2019, 116(14):6800-6805.
Zheng, S. et al., MotionCor2: Anisotropic Correction of Beam-induced Motion for Improved Cryo-electron Microscopy, Nature Methods, 2017, 14(4):331-332.
Zivanov, J. et al., New Tools for Automated High-resolution Cryo-EM Structure Determination in RELION-3, eLife, 2018, 7:e42166, pp. 1-22.
Afonine, P. et al., Real-Space Refinement in PHENIX for cryo-EM and Crystallography, Acta Crystallographica Section D: Structural Biology, 2018, 74(6):531-544.
Ahi, Y. et al., Components of Adenovirus Genome Packaging, Frontiers in Microbiology, 2016, vol. 7, Article 1503, pp. 1-15.
Allay, J. et al., Good Manufacturing Practice Production of Self-Complementary Serotype 8 Adeno-Associated Viral Vector for a Hemophilia B Clinical Trial. Human Gene Therapy, 2011, 22(5):595-604.
Aucoin, M. et al., Improving AAV Vector Yield in Insect Cells by Modulating the Temperature after Infection, Biotechnology and Bioengineering, 2007, 97(6):1501-1509.
Benskey, M. et al., Continuous Collection of Adeno-Associated Virus from Producer Cell Medium Significantly Increases Total Viral Yield, Human Gene Therapy Methods, 2016, 27(1):32-45.
Brown, C. et al., Assembly of Empty Capsids by Using Baculovirus Recombinants Expressing Human Parvovirus B19 Structural Proteins, Journal of Virology, 1991, 65(5):2702-2706.
Buck, C. et al., Efficient Intracellular Assembly of Papillomaviral Vectors, Journal of Virology, 2004, 78(2):751-757.
Burnham, B. et al., Analytical Ultracentrifugation as an Approach to Characterize Recombinant Adeno-Associated Viral Vectors, Human Gene Therapy Methods, 2015, 26(6):228-242.
Chen, V. et al., MolProbity: All-Atom Structure Validation for Macromolecular Crystallography, Acta Crystallographica Section D: Biological Crystallography, 2010, 66(1):12-21.
Christensen, J. et al., Production of Mink Enteritis Parvovirus Empty Capsids by Expression in a Baculovirus Vector System: A Recombinant Vaccine for Mink Enteritis Parvovirus in Mink, Journal of General Virology, 1994, 75(1):149-155.
Cianfrocco, M. et al., cryoem-cloud-tools: A Software Platform to Deploy and Manage cryo-EM Jobs in the Cloud, Journal of Structural Biology, 2018, 203(3):230-235.
Cotmore, S. et al., Encapsidation of Minute Virus of Mice DNA: Aspects of the Translocation Mechanism Revealed by the Structure of Partially Packaged Genomes, Virology, 2005, 336(1):100-112.
Dandey, V. et al., Spotiton: New Features and Applications, Journal of Structural Biology, 2018, 202(2):161-169.
Davidoff, A. et al., Purification of Recombinant Adeno-Associated Virus Type 8 Vectors by Ion Exchange Chromatography Generates Clinical Grade Vector Stock, Journal of Virological Methods, 2004, 121(2):209-215.
Diaz-Avalos, R. et al., Structure of the Stacked Disk Aggregate of Tobacco Mosaic Virus Protein, Biophysical Journal, 1998, 74(1):595-603.
Efron, Better Bootstrap Confidence Intervals, Journal of the American Statistical Association, 1987, 82(397):171-185.
Emsley, P. et al., Features and Development of Coot, Acta Crystallographica Section D: Biological Crystallography, 2010, 66(4):486-501.

(56) References Cited

OTHER PUBLICATIONS

Feller, The Fundamental Limit Theorems in Probability, Bulletin of the American Mathematical Society, 1945, 51(11):800-832.
Fernandez-Leiro, R. et al., A Pipeline Approach to Single-Particle Processing in RELION, Acta Crystallographica Section D: Structural Biology, 2017, 73(6):496-502.
Gao, K. et al., Empty Virions in AAV8 Vector Preparations Reduce Transduction Efficiency and May Cause Total Viral Particle Dose-Limiting Side Effects, Molecular Therapy—Methods & Clinical Development, Sep. 2014, 8 pages.
Gill, S. et al., Calculation of Protein Extinction Coefficients from Amino Acid Sequence Data, Analytical Biochemistry, 1989, 182(2):319-326.
Ginn, S. et al., Gene Therapy Clinical Trials Worldwide to 2017: An Update, Journal of Gene Medicine, 2018, 20(5): e3015,, 16 pages.
Grant, T. et al., cisTEM, User-Friendly Software for Single-Particle Image Processing. eLife, 2018, 7e35383, pp. 1-24.
Hauck, B. et al., Undetectable Transcription of Cap in a Clinical AAV Vector: Implications for Preformed Capsid in Immune Responses, Molecular Therapy, 2009, 17(1):144-152.
Hernando, E. et al., Biochemical and Physical Characterization of Parvovirus Minute Virus of Mice Virus-like Particles, Virology, 2000, 267(2):299-309.
Heymann, J. et al., Bsoft: Image Processing and Molecular Modeling for Electron Microscopy, Journal of Structural Biology, 2007, 157(1):3-18.
Hosel, M. et al., Toll-like Receptor 2-mediated Innate Immune Response in Human Nonparenchymal Liver Cells Toward Adeno-associated Viral Vectors, Hepatology, 2012, 55(1):287-297.
Jung, J. et al., High-Resolution cryo-EM Structures of Outbreak Strain Human Norovirus Shells Reveal Size Variations, Proceedings of the National Academy of Sciences, 2019, 116(26):12828-12832.
Kailasan, S. et al., Mapping Antigenic Epitopes on the Human Bocavirus Capsid, Journal of Virology, 2016, 90(9):4670-4680.
Kajigaya, S. et al., Self-assembled B19 Parvovirus Capsids, Produced in a Baculovirus System, are Antigenically and Immunogenically Similar to Native Virions, Proceedings of the National Academy of Sciences, 1991, 88(11):4646-4650.
Kaludov, N. et al., Scalable Purification of Adeno-associated Virus Type 2, 4, or 5 Using Ion-Exchange Chromatography, Human Gene Therapy, 2002, 13(10):1235-1243.
Kalynych, S. et al., Cryo-EM Study of Slow Bee Paralysis Virus at low pH Reveals Iflavirus Genome Release Mechanism, Proceedings of the National Academy of Sciences, 2017, 114(3):598-603.
Kimanius, D. et al., Accelerated cryo-EM Structure Determination with Parallelisation Using GPUs in RELION-2, eLife, 2016, 5:e18722, 21 pages.
King, J. et al., DNA Helicase-Mediated Packaging of Adeno-associated Virus Type 2 Genomes into Preformed Capsids, EMBO Journal, 2001, 20(12):3282-3291.
Kohlbrenner, E. et al., Quantification of AAV Particle Titers by Infrared Fluorescence Scanning of Coomassie-Stained Sodium Dodecyl Sulfate—Polyacrylamide Gels, Human Gene Therapy, Part B: Methods, 2012, 23(3):198-203.
Kuck, D. et al., Development of AAV Serotype-Specific ELISAs Using Novel Monoclonal Antibodies, Journal of Virological Methods, 2007, 140(1-2):17-24.
Lerch, T. et al., The Structure of Adeno-associated Virus Serotype 3B (AAV-3B): Insights into Receptor Binding and Immune Evasion, Virology, 2010, 403(1):26-36.
Lock, M. et al., Rapid, Simple, and Versatile Manufacturing of Recombinant Adeno-associated Viral Vectors at Scale, Human Gene Therapy, 2010, 21(10):1259-1271.
Lock, M. et al., Analysis of Particle Content of Recombinant Adeno-associated Virus Serotype 8 Vectors by Ion-exchange Chromatography, Human Gene Therapy, Part B: Methods, 2012, 23(1):56-64.
Maurer, A. et al., The Assembly-activating Protein Promotes Stability and Interactions Between AAV's Viral Proteins to Nucleate Capsid Assembly, Cell Reports, 2018, 23(6):1817-1830.
Mejia, A. et al., Preclinical Model to Test Human Papillomavirus Virus (HPV) Capsid Vaccines in vivo Using Infectious HPV/cottontail Rabbit Papillomavirus Chimeric Papillomavirus Particles, Journal of Virology, 2006, 80(24):12393-12397.
Mingozzi et al., CD8+ T-cell Responses to Adeno-associated Virus Capsid in Humans, Nature Medicine, 2007, 13(4):419-422.
Moreira, E. et al., A Conserved Influenza A Virus Nucleoprotein Code Controls Specific Viral Genome Packaging, Nature Communications, 2016, 7(1):12861, pp. 1-11.
Mullapudi, E. et al., Cryo-electron Microscopy Study of the Genome Release of the Dicistrovirus Israeli Acute Bee Paralysis Virus, Journal of Virology, 2017, 91(4):10-1128.
Organtini, L. et al., Honey Bee Deformed Wing Virus Structures Reveal that Conformational Changes Accompany Genome Release, Journal of Virology, 2017, 91(2);e01795-16, 15 pages.
Pettersen, E. et al., UCSF Chimera—A Visualization System for Exploratory Research and Analysis, Journal of Computational Chemistry, 2004, 25(13):1605-1612.
Pierson, E. et al., Resolving Adeno-associated Viral Particle Diversity with Charge Detection Mass Spectrometry, Analytical Chemistry, 2016, 88(13):6718-6725.
Punjani, A. et al., cryoSPARC: Algorithms for Rapid Unsupervised cryo-EM Structure Determination, Nature Methods, 2017, 14(3):290-296.
Qu, G et al., Separation of Adeno-associated Virus Type 2 Empty Particles from Genome Containing Vectors by Anion-exchange Column Chromatography, Journal of Virological Methods, 2007, 140(1-2):183-192.
Rabinowitz, J. et al., Cross-packaging of a Single Adeno-associated Virus (AAV) Type 2 Vector Genome into Multiple AAV Serotypes Enables Transduction with Broad Specificity, Journal of Virology, 2002, 76(2):791-801.
PCT International Search Report and Written Opinion, PCT/US2020/047388, Nov. 6, 2020, 6 pages.

\* cited by examiner

METHODS AND SYSTEMS FOR ESTIMATING PROPORTION OF FILLED VIRUS CAPSIDS USING CRYO-EM

CROSS-REFERENCE TO RELATED APPLICATIONS

This application is based on, claims the benefit of, and incorporates herein in its entirety, U.S. Provisional Patent Application Ser. No. 62/891,165 filed on Aug. 23, 2019, and entitled "FILLING AAV CAPSIDS: ESTIMATING SUCCESS BY CRYO-EM."

GOVERNMENT SUPPORT STATEMENT

N/A.

BACKGROUND

Adeno-associated viruses (AAV) have been employed successfully as gene therapy vectors in treating various genetic diseases for almost two decades. However, transgene packaging is usually imperfect, and developing a rapid and accurate method for measuring the proportion of DNA encapsidation is an important step for improving the downstream process of large scale vector production.

SUMMARY OF THE PRESENT DISCLOSURE

As disclosed herein, 2D class averages and 3D classes were used as intermediate outputs in the single particle cryo-electron microscopy (cryo-EM) image reconstruction pipeline to determine the proportion of DNA-packaged and empty capsid populations. Further, two different preparations of AAV3 were analyzed to estimate the minimum number of particles required to be sampled by cryo-EM in order for robust calculation of the proportion of the full vs. empty capsids in any given sample. Finally, it was determined that cost analysis applied to the minimum amount of data required for a valid ratio suggests that cryo-EM provides an effective approach to analyze vector preparations.

In one embodiment the invention provides a method of estimating a proportion of particles filled with material. The method includes: obtaining an image depicting a plurality of particles; generating a plurality of classes based on the plurality of particles; identifying at least one of the plurality of classes having a central portion with a greater density than a central portion of at least one other of the classes; and estimating a proportion of the plurality of particles that are filled with material based on identifying at least one of the classes having a central portion with high density.

In another embodiment the invention provides a system for estimating a proportion of particles filled with material. The system includes: a memory in communication with a processor, the memory having stored thereon a set of instructions which, when executed by the processor, cause the processor to: obtain an image depicting a plurality of particles; generate a plurality of classes based on the plurality of particles; identify at least one of the plurality of classes having a central portion with a greater density than a central portion of at least one other of the classes; and estimate a proportion of the plurality of particles that are filled with material based on identifying at least one of the classes having a central portion with high density.

BRIEF DESCRIPTION OF THE DRAWINGS

The following drawings are provided to help illustrate various features of example embodiments of the disclosure, and are not intended to limit the scope of the disclosure or exclude alternative implementations.

FIG. 1A shows surface renditions of the maps colored by radius to highlight surface features, where the color key indicates distance from the center of the capsid.

FIG. 2A is a schematic figure which represents internal DNA density (innermost portion, 100), capsid density (middle band, 101), mask used in 2D classification (outer band, 102) and box used to extract particles from micrographs (103) and the distance from the center to the edge of the DNA density (line 'a') and edge of capsid density (line 'b'). FIG. 2B shows 2D class averages which reveal classes of genome-filled (solid) and empty (hollow) capsids. FIG. 2C shows radial density profiles of the class averages which reveal straightforward separation into two distinct populations: One with density remaining uniform radially (upper grouping of traces), representing full population and another (lower grouping of traces) with sharp increase in density from the center to the edge of the capsid representing empty capsids. FIG. 2D shows that an internal density histogram displays two peaks representative of the empty and full populations.

FIG. 5A shows that 2D class averages reveal classes of genome-filled (solid) and empty (hollow) capsids. FIG. 5B shows that radial density profiles of the class averages reveal a range of genome density. FIG. 5C shows that an internal density histogram displays two peaks representative of the empty and full populations with signal for intermediate density as well.

DETAILED DESCRIPTION OF THE PRESENT DISCLOSURE

Figure 1A:
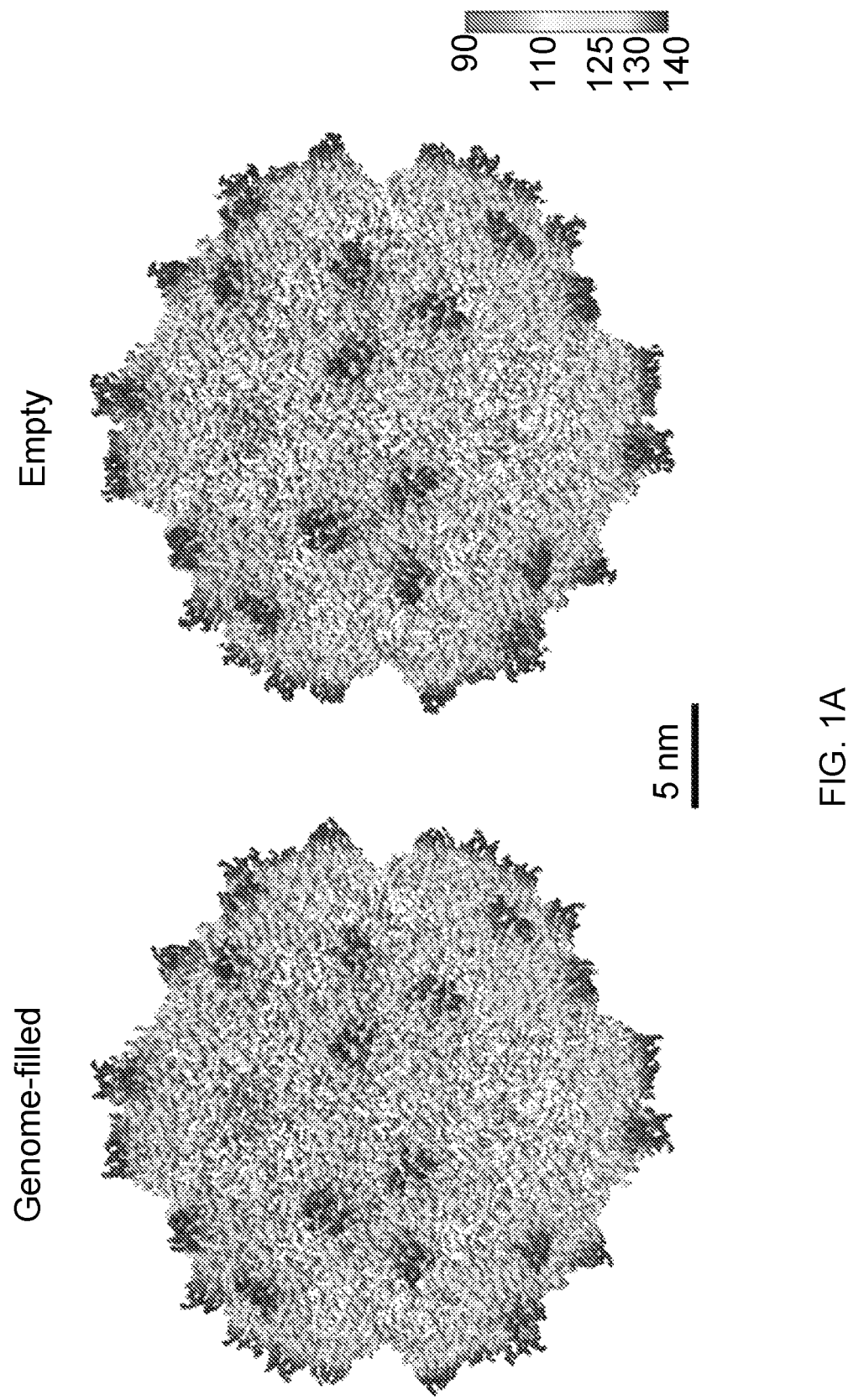
FIG. 1A shows cryo-EM density maps of AAV3 genome-filled (left) and empty (right) capsids.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

Parvoviruses are small, 22-25 nm in diameter, icosahedral, non-enveloped viruses that package a single-stranded DNA genome of about 5 kb and infect a wide variety of organisms ranging from insects to humans. Previous studies have shown that empty capsids form first and decrease in number over time as genome-filled capsids appear. Recombinant expression of the major capsid proteins often yields the self-assembly of virus-like particles, such as for minute virus of mice (MVM) (Protoparvovirus), parvovirus B19 (Erythroparvovirus), adeno-associated virus (AAV) (Dependoparvovirus), human bocavirus 1-4 (HBoV) (Bocaparvovirus), and Aleutian mink disease parvovirus (ADV) (Amdoparvovirus), suggesting that capsid assembly is independent of the presence of genome. Together with identification of genome packaging motors, the genome is most likely driven into pre-formed parvovirus capsids, which leads to mixed populations of genome-filled and empty capsids.

AAV has been developed as a successful gene therapy vector. Notably, the recent approval of its use in gene therapy for acute lymphoblastic leukemia, B-cell lymphoma, and retinal dystrophy has led to increased large scale propagation and purification of AAV vectors and on-going efforts to improve yield. However, the persistence of unpackaged virions remains a major challenge for efficient AAV vector production. Empty capsids pose several liabilities, such as inhibiting the transduction by competing with capable, genome-filled vectors for host cell attachment and entry as well as promoting an immune response without the therapeutic benefit of delivering the payload. While many of the examples disclosed herein are presented in the context of adeno-associated virus (AAV) capsids, lentivirus and papillomavirus capsids are also being developed as gene therapy vectors and would respond well to the described techniques.

A variety of techniques are currently employed to remove empty particles from purified vector preparations, including density gradient ultracentrifugation and ion-exchange chromatography. An accurate method of assessing the proportion of empty particles in any purified preparation is imperative for determining sample quality and estimating efficacy. Optical density measurements, ELISA, qPCR, and negative stain transmission electron microscopy (TEM) are used routinely for quantification of vectors, but tend to be imprecise since background contributes to signal and negative stain can alter the state of the particle and cause damage to the capsid in some cases. Disclosed herein are embodiments including methods and systems for using cryo-electron microscopy (cryo-EM) to visualize particles in native or near-native states to ensure accuracy of the capsid states and to allow straightforward estimation of DNA-filled and empty capsid populations.

For cryo-EM, biological molecules are captured in a hydrated state by plunge freezing before data are collected using an electron microscope. The resulting images generally have a low signal-to-noise ratio (SNR) due to the lack of contrast enhancers like stains and a limited electron dose in order to avoid specimen damage. Accordingly, single particle reconstruction (SPR) methods have been developed to enhance the signal by iteratively sorting and averaging particle images, and now most three-dimensional (3D) reconstruction programs group and align imaged particles corresponding to the same orientations in a process called two-dimensional (2D) classification. The general approach involves a multi-reference refinement process in which particle images are compared against reference images in different orientations. Probability scores are assigned for each comparison according to the degree of similarity with the reference image. Class averages are generated as weighted averages of all assignments, which are then used as new reference images for each successive iteration. 2D classification is usually followed by 3D classification, which is not unlike the former, except a user-defined reference model is used as a template to sort particles into different classes. Although it is not the usual workflow, 3D classification can be performed independently of 2D classification. In general, 2D classification is used to limit the population of structures in the data to those that are actual virus particles, since computer programs are used to select particles in the first place and the algorithms that are employed may make some mistakes. In some cases, areas in an image that are selected may in fact be due to ice contamination or may be the edge of the carbon support, both of which may have a similar appearance to virus capsid particles. These non-particles are eliminated using 2D classes/classification, which also provides an initial basic sorting of real particles to help evaluate the data set. With a volume reference, this process is capable of distinguishing samples with structural heterogeneity such as conformational variabilities in protein complexes and virus particles with varying genomic contents, multiple structural states, or polymorphisms.

A mixed population of empty and genome-filled AAV particles was sorted to solve the corresponding atomic resolution structures. The DNA-filled capsids yielded a density map at 3.42 Å that included significant density consistent with packaged DNA, whereas those images identified as empty capsids yielded a structure at 3.26 Å that was indeed lacking internal density resolution. The images were then used to develop a reliable classification procedure that showed statistically the minimum number of particles needed to complete the analysis. The disclosed methods and systems can readily distinguish genome-filled, partially-filled, and unfilled populations to determine the proportion of full to empty capsids as a tool for gene therapy research. Cost analysis demonstrated that this is an affordable method for researchers and clinicians.

Figure 8:
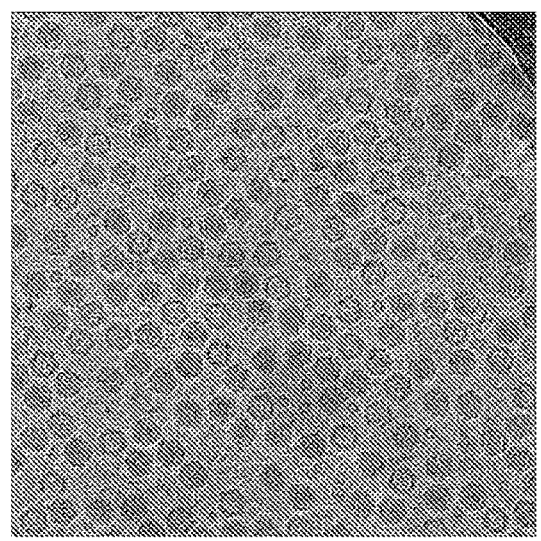
FIG. 8 shows a representative cryo-EM micrograph of an AAV sample taken on a Thermo Fisher Titan Krios microscope and recorded at a nominal magnification of 59,000× on a Falcon 3 camera. To maximize particle count, the AAV sample of concentration 2 mg/ml was deposited on a Quantifoil R2/1 grid with 2 nm continuous carbon. Approximately 150 particles are visible in the field.

Thus, in various embodiments a virus capsid sample is prepared, the sample including a mixed population of capsids some of which may be empty, some may be completely filled with genomic material, and some may be partially filled with genomic material. A portion of the sample may be made into a cryo-EM preparation 50 which is viewed on a cryo-EM system 100 (FIG. 1E). Using the cryo-EM system 100, a user can collect one or more images of the capsid preparation (e.g. as shown in FIG. 8) which are then saved on the cryo-EM system 100 and/or transferred to a computer system 200 for processing, for example using the procedures disclosed herein.

Figure 1B:
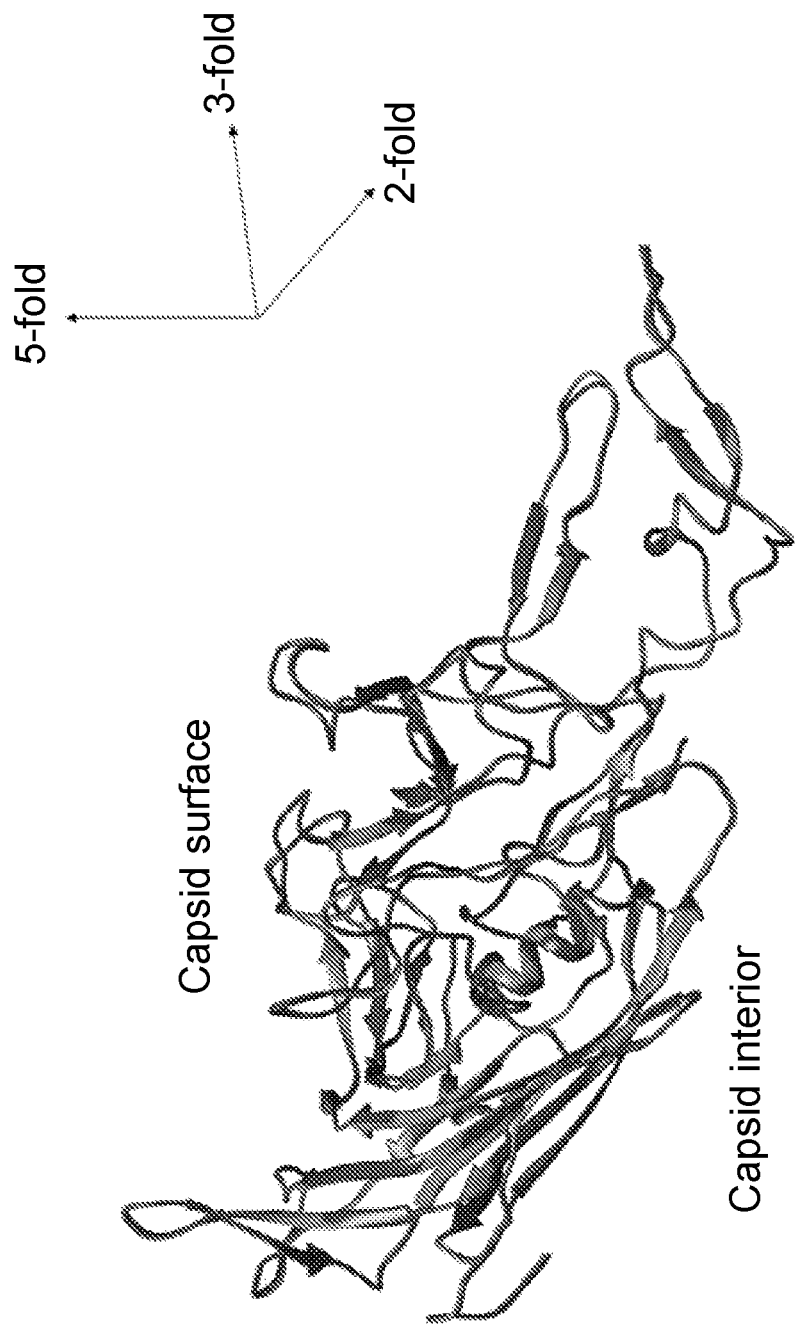
FIG. 1B shows AAV3 full (blue) and empty (red) structures rendered as ribbon superimposed to show near identical structures.
Figure 1C:
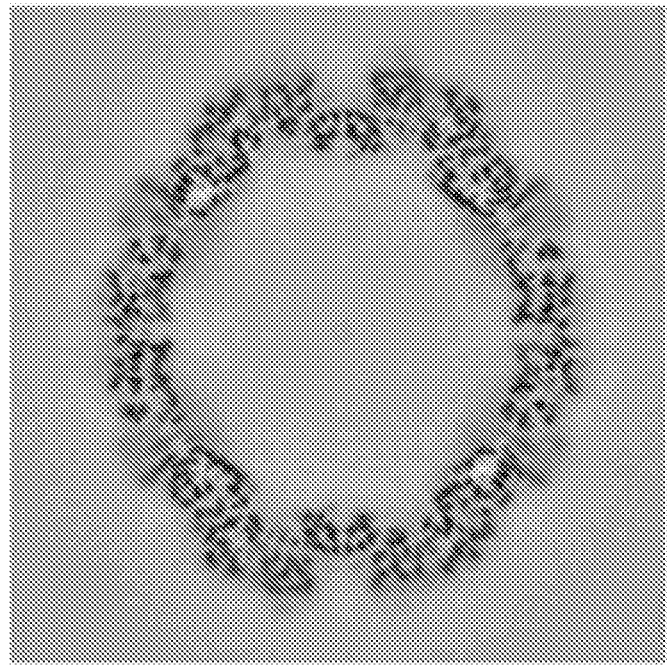
FIG. 1C shows central sections which illustrate the quality of the density maps and the presence (left) or absence (right) of genome density.
Figure 1C:
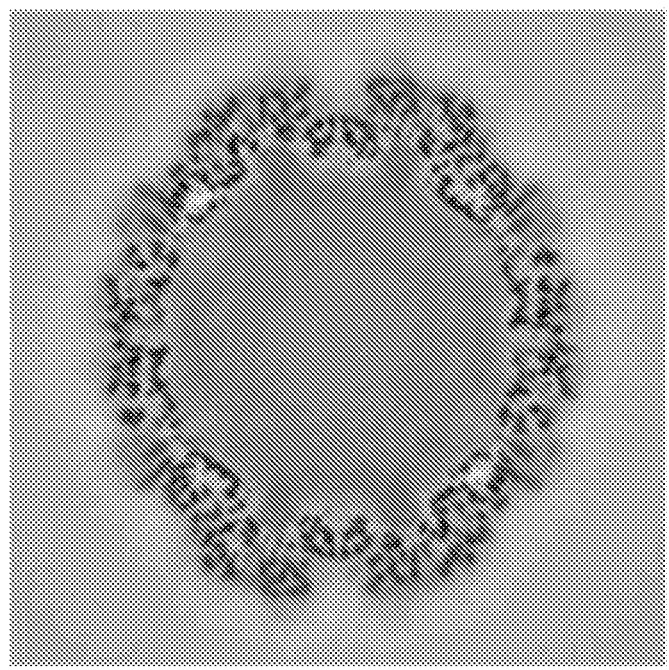
Figure 1D:
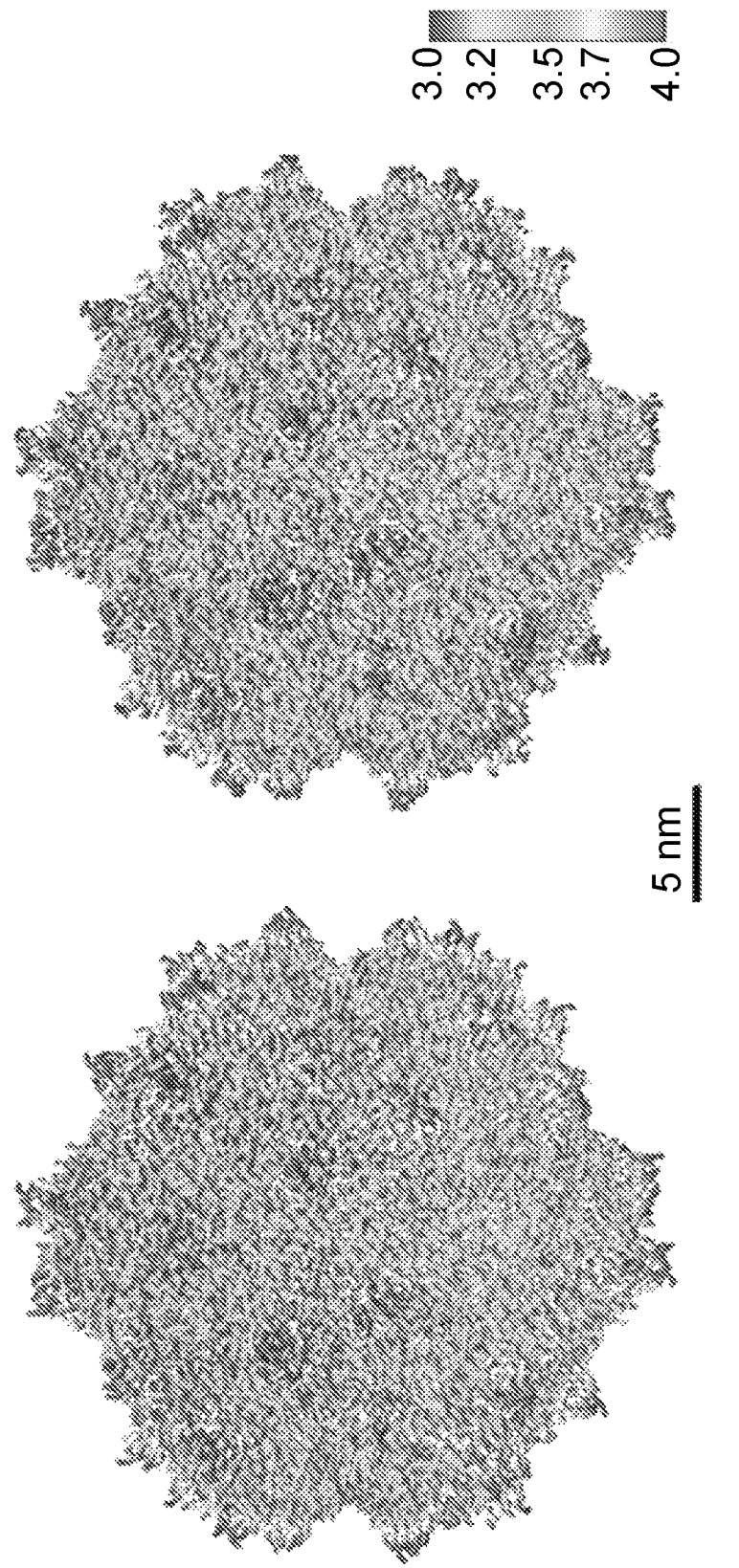
FIG. 1D shows that local resolution estimation reveals flexibility at the three-fold region, where the color key indicates resolution in Angstroms.
Figure 1E:
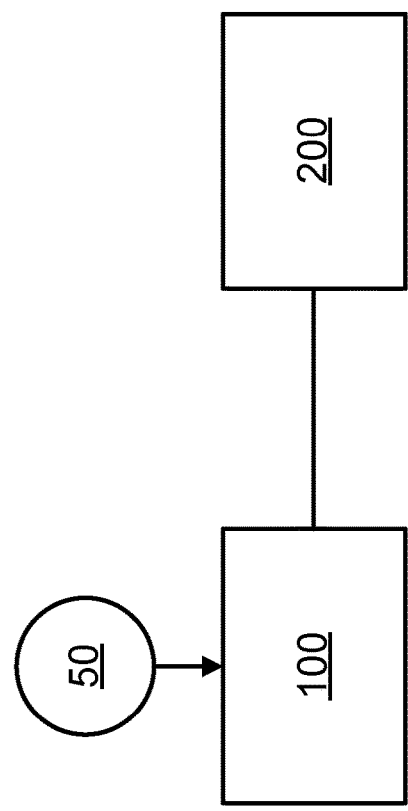
FIG. 1E shows a diagram of a system for collecting and processing data.
Figure 1F:
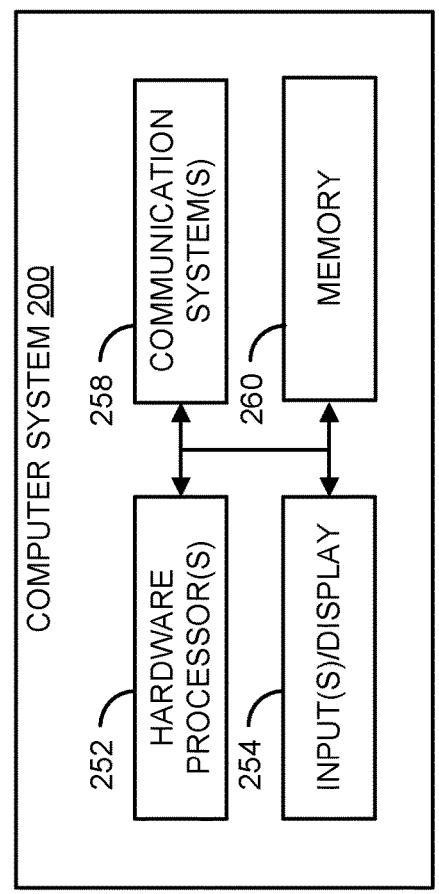
FIG. 1F shows a diagram of a computer system that can be used as a standalone system and/or with the system of FIG. 1E.

FIG. 1F shows an embodiment of a computer system 200 that can be used to process data in accordance with embodiments of the disclosed subject matter. As shown in FIG. 1F, in some embodiments, computer system 200 can include a hardware processor 252, a user interface and/or display 254, one or more communication systems 258, and memory 260. In some embodiments, hardware processor 252 can be any suitable hardware processor or combination of processors, such as a central processing unit (CPU), a graphics processing unit (GPU), a microcontroller (MCU), a field programmable gate array (FPGA), an application-specific integrated circuit (ASIC), a dedicated image processor, etc. In some embodiments, input(s) and/or display 254 can include any suitable display device(s), such as a computer monitor, a touchscreen, a television, etc., and/or input devices and/or sensors that can be used to receive user input, such as a keyboard, one or more physical buttons with dedicated functions, one or more physical buttons with software programmable functions, a mouse, a touchscreen, a microphone, a gaze tracking system, motion sensors, etc.

In some embodiments, communications systems 258 can include any suitable hardware, firmware, and/or software for communicating information over a communication network and/or any other suitable communication networks. For example, communications systems 258 can include one or more transceivers, one or more communication chips and/or chip sets, etc. In a more particular example, communications systems 258 can include hardware, firmware and/or software that can be used to establish a Wi-Fi connection, a Bluetooth connection, a cellular connection, an Ethernet connection, an optical connection, etc.

In some embodiments, the communication network can be any suitable communication network or combination of communication networks. For example, the communication network can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, WiMAX, etc.), a wired network, etc. In some embodiments, the communication network can be a local area network, a wide area network, a public network (e.g., the Internet), a private or semi-private network (e.g., a corporate or university intranet), any other suitable type of network, or any suitable combination of networks. Communications links between spectroscopy system and the communication network can each be any suitable communications link or combination of communications links, such as wired links, fiber optic links, Wi-Fi links, Bluetooth links, cellular links, etc.

In some embodiments, memory 260 can include any suitable storage device or devices that can be used to store instructions, values, etc., that can be used, for example, by hardware processor 252 to process image data generated by one or more optical detectors, to present content using input(s)/display 254, to communicate with an external computing device via communications system(s) 258, etc. Memory 260 can include any suitable volatile memory, non-volatile memory, storage, any other suitable type of storage medium, or any suitable combination thereof. For example, memory 260 can include RAM, ROM, EEPROM, one or more flash drives, one or more hard disks, one or more solid state drives, one or more optical drives, etc. In some embodiments, memory 260 can have encoded thereon a computer program for carrying out one or more embodiments of the disclosed procedures. In some such embodiments, hardware processor 252 can facilitate collection of data from cryo-EM system 100 and/or transfer of data from the cryo-EM system 100 to the computer system 200.

Various embodiments may be carried out with a system that includes a memory (such as memory 260) in communication with a processor (such as processor 252), the memory having stored thereon a set of instructions which, when executed by the processor, cause the processor to carry out steps of various embodiments of the procedures disclosed herein. In some embodiments, the memory may include any suitable computer readable media which can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

Figure 1G:
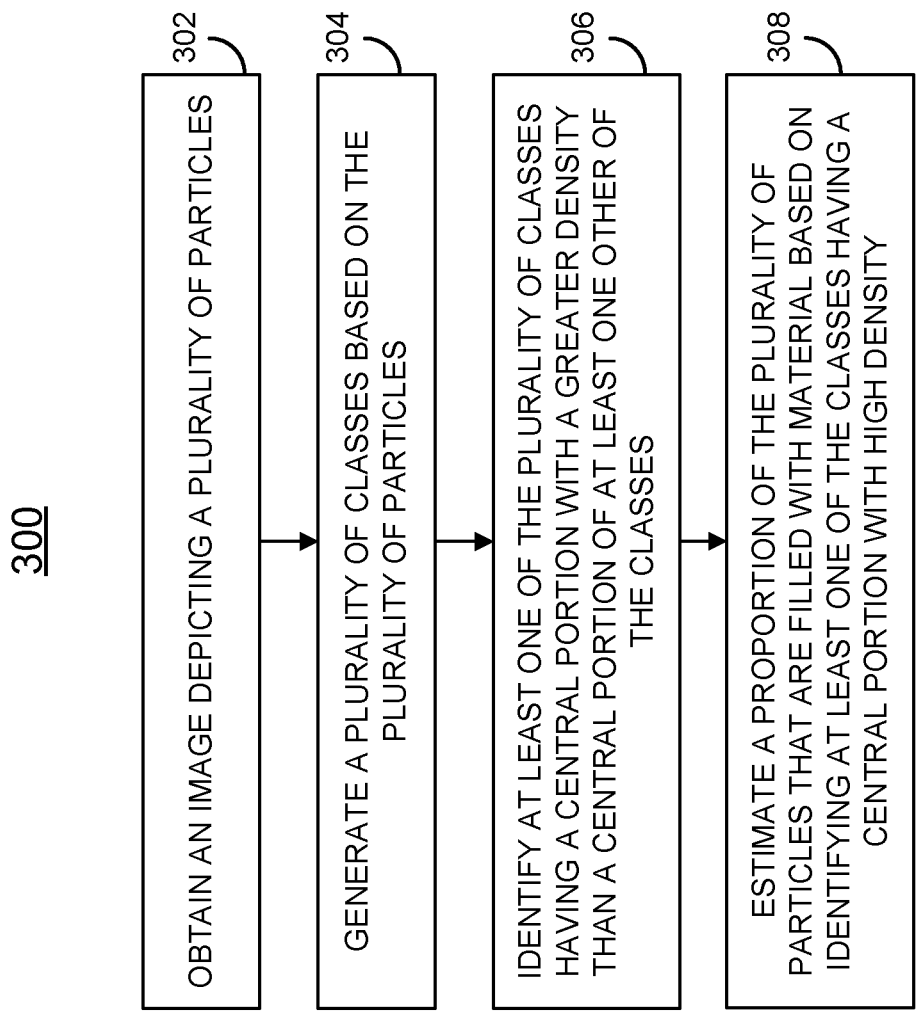
FIG. 1G shows an example of a process for estimating a proportion of particles filled with material in accordance with some embodiments of the disclosed subject matter.

FIG. 1G shows an example 300 of a process for estimating a proportion of particles filled with material in accordance with some embodiments of the disclosed subject matter. As shown in FIG. 1G, at 302, process 300 can obtain an image depicting a plurality of particles. At 304, process 300 can generate a plurality of classes based on the plurality of particles. At 306, process 300 can identify at least one of the plurality of classes having a central portion with a greater density than a central portion of at least one other of the classes. At 308, process 300 can estimate a proportion of the plurality of particles that are filled with material based on identifying at least one of the classes having a central portion with high density.

It should be understood that the above described steps of the processes of FIG. 1G can be executed or performed in any order or sequence not limited to the order and sequence shown and described in the figures. Also, some of the above steps of the processes of FIG. 1G can be executed or performed substantially simultaneously where appropriate or in parallel to reduce latency and processing times.

The following is a description of particular embodiments of the procedures:

Packaged and Unpackaged AAV3 Capsids are Structurally Indistinguishable from the Exterior View Distinct populations of genome-filled and -unfilled AAV3 capsids within the same cryo-EM dataset were reconstructed independently to 3.42 Å and 3.26 Å, respectively (FIG. 1A). The AAV3B X-ray crystal structure (PDB ID: 3KIC) was used as the initial template and the model building proceeded with amino acid differences corrected. The two cryo-EM structures were superimposable with the RMSD value of 0.244 Å indicating that the full and empty capsid structures are essentially identical (FIG. 1B). It was possible to trace the majority of the alpha-carbon backbone in both maps with the exception of density missing at the three-fold spikes on the exterior of the capsid (amino acids 454 to 457) and at the five-fold pore (amino acids 326 to 329). However, the central sections of the genome-filled and empty maps show difference in density indicating presence and absence of genome (FIG. 1C). Local resolution mapping showed most of both capsid shells were resolved to 3.2 Å but the spikes and five-fold pore were between 3.7 to 4 Å resolution (FIG. 1D), indicating those regions to be of poorer density likely resulting from flexibility and both maps reported essentially equal B factors suggesting flexibility was similar between the two structures.

Figure 2A:
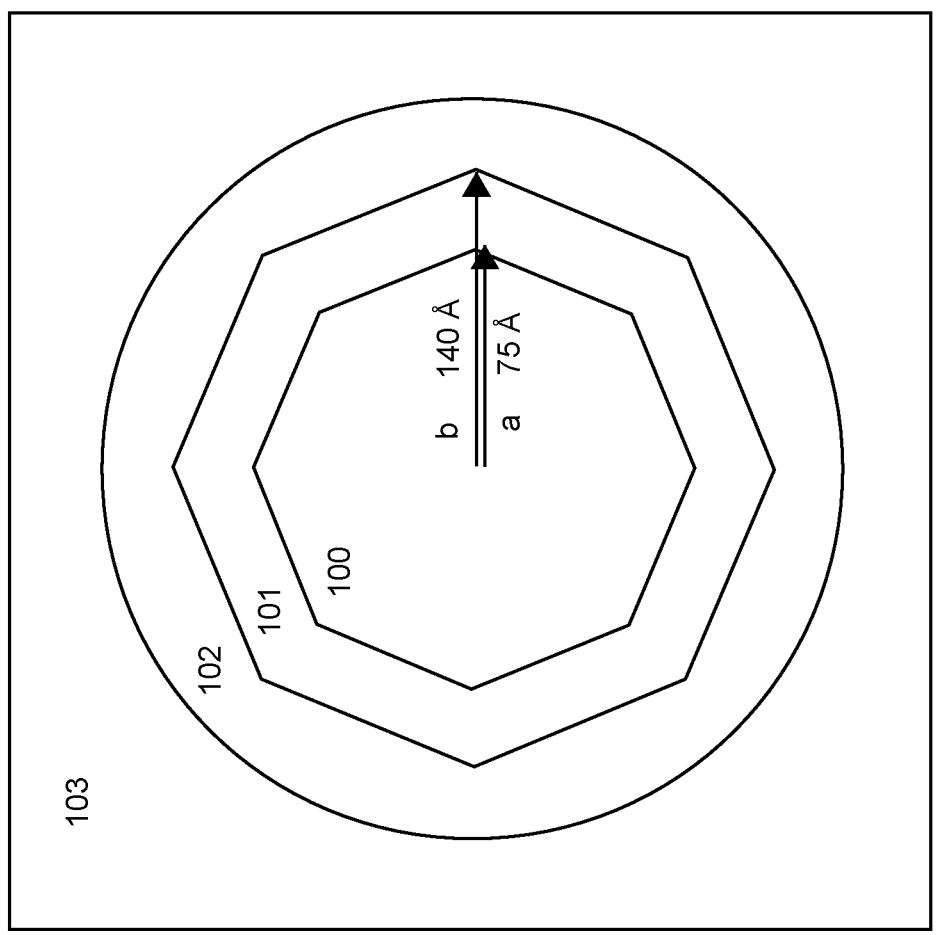
FIGS. 2A-2D present data related to sample 1.
Figure 2B:
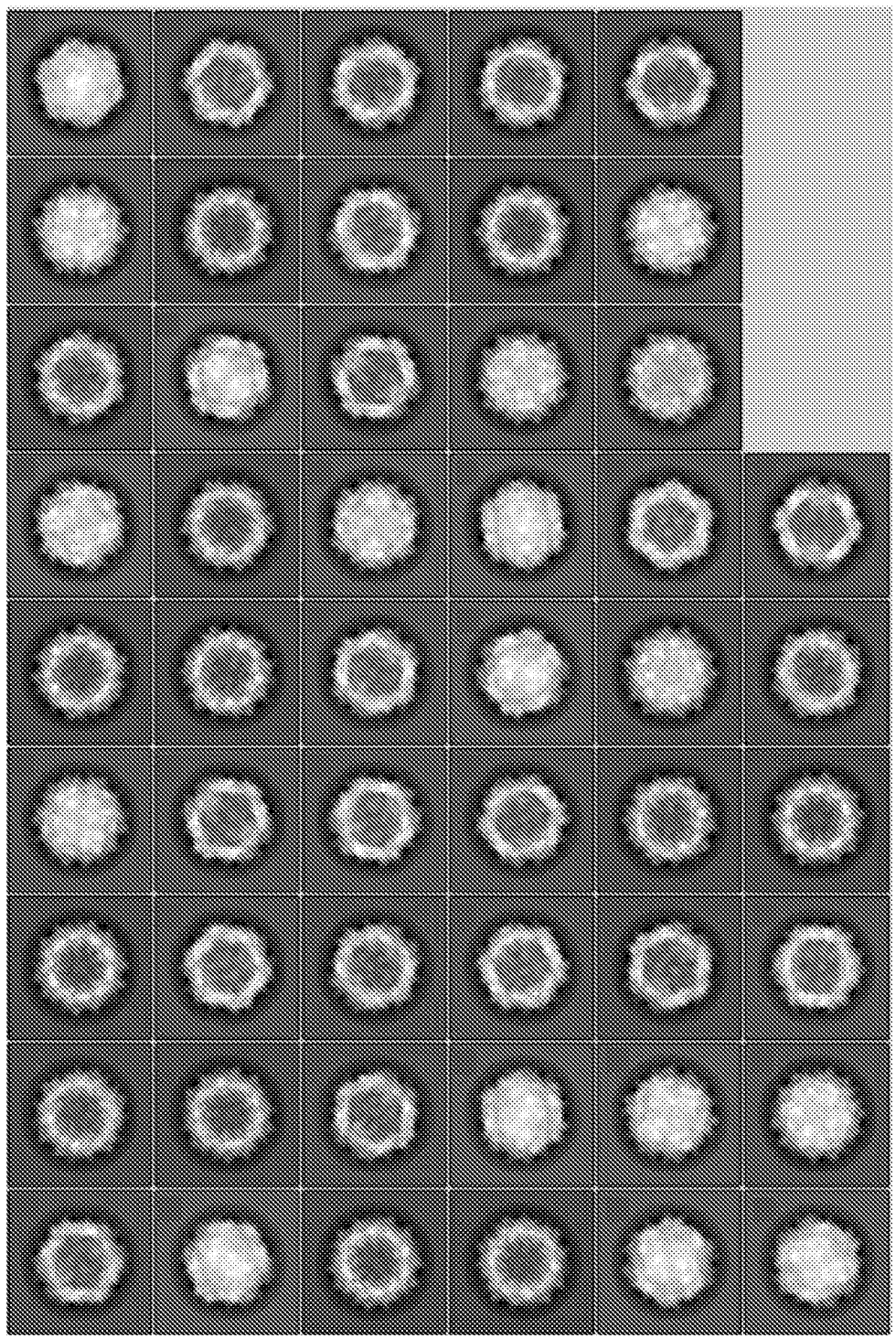
Figure 2C:
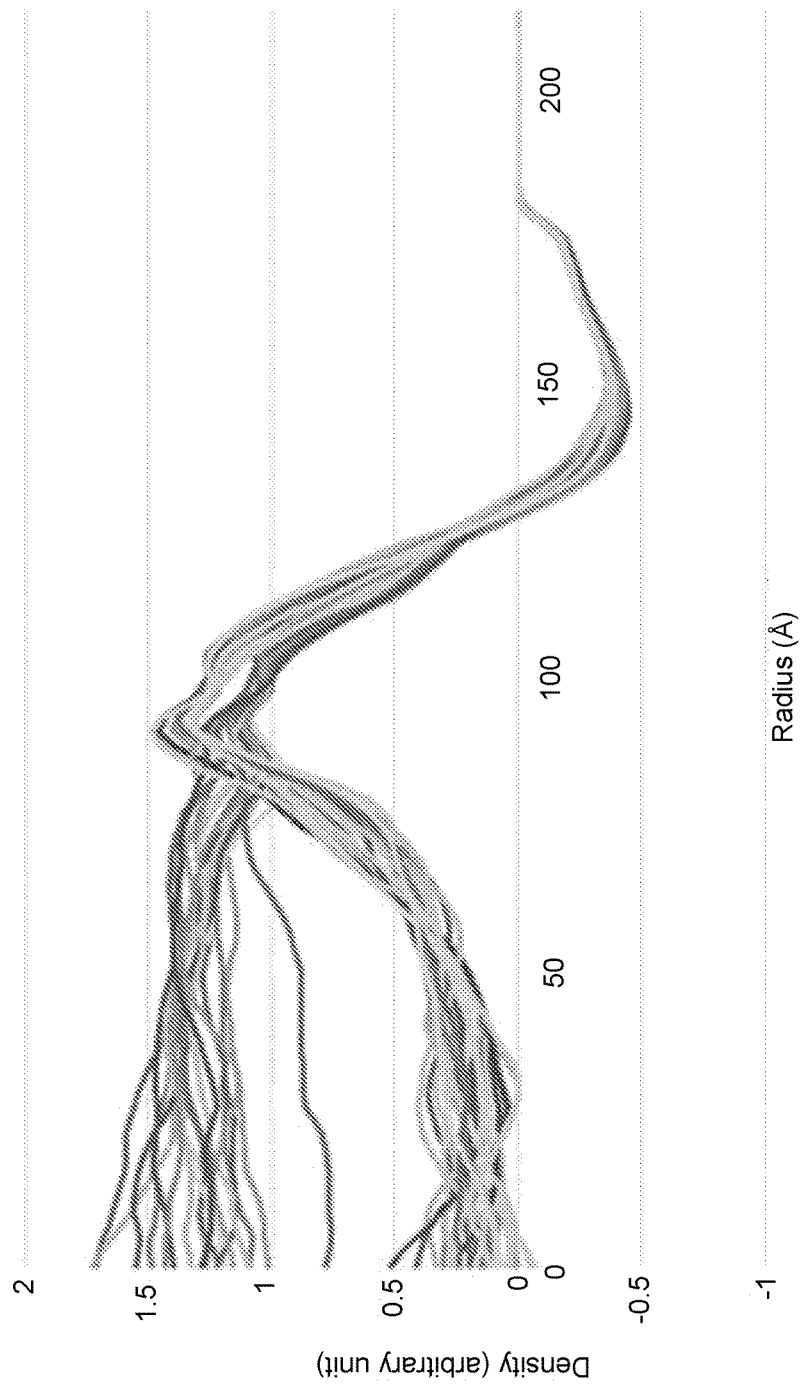
Figure 2D:
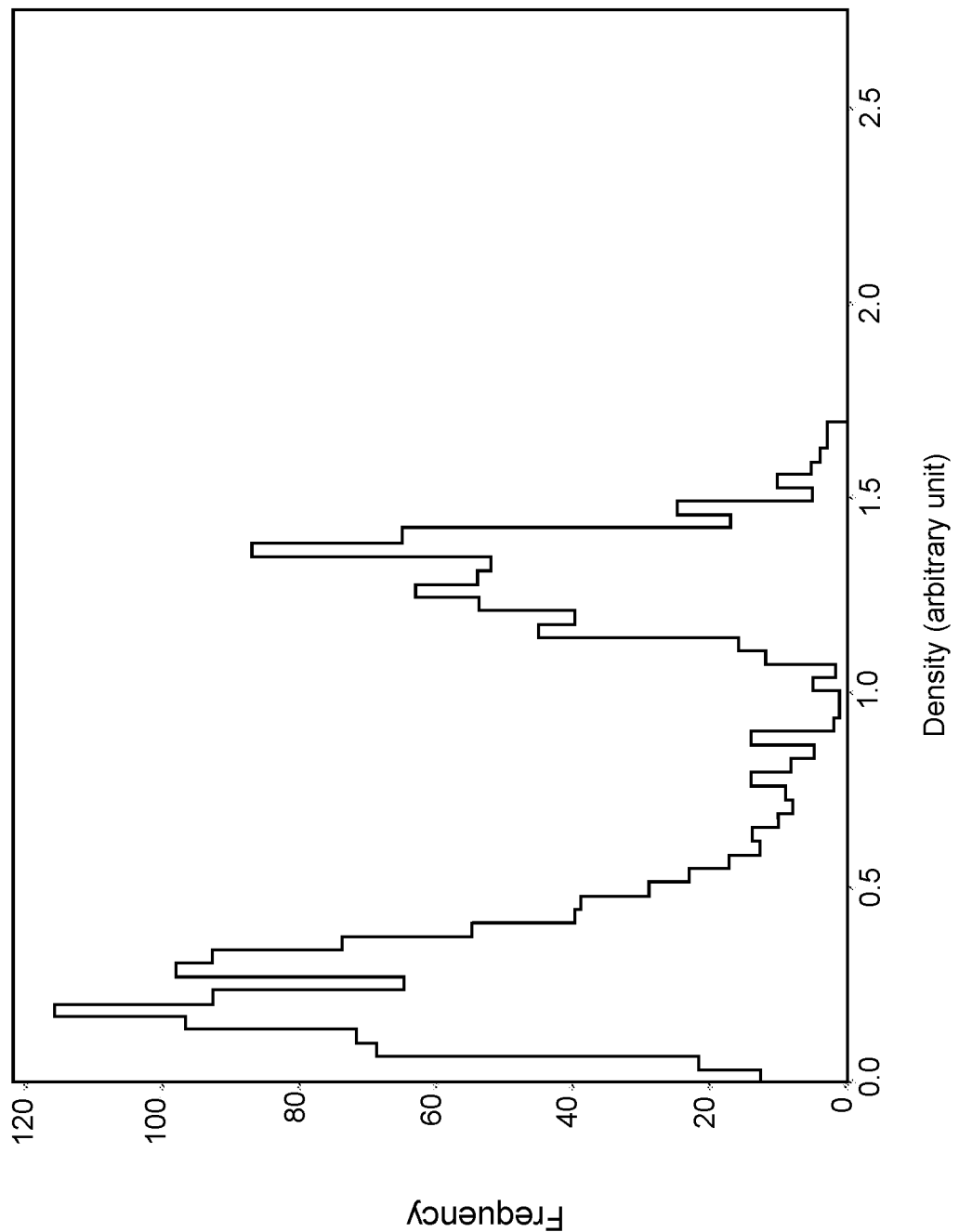

A General Model to Estimate Proportion of Genome-Filled Capsids at a Defined Level of Confidence Since the presence or absence of genome was revealed by the central section of each map (FIG. 1C), which is essentially a 2D slice of the 3D map, the role of 2D class averages was explored in differentiating particles containing genome and empty particles. The 2D classification process, an intermediate step in the 3D reconstruction approach, successfully grouped particles by the presence or absence of packaged DNA density and hence resulted in two types of 2D class averages (FIG. 2B). Genome-containing particles had density throughout the entire region of the projected capsid, whereas the class averages containing empty particles were represented by densities that appear ring-like with empty centers due to the absence of genome. Radial density profiles (FIG. 2C) along with the internal density histogram (FIG. 2D) confirmed this visualization of two distinct populations: one where the density values ranged between 1 and 1.5 from the center to the edge of the particle corresponding to DNA-filled capsids, and another where the density values increased sharply from the center to the edge, ranging between 0 and 0.5 and peaking at 1.5, indicating the presence of an empty core.

Figure 5A:
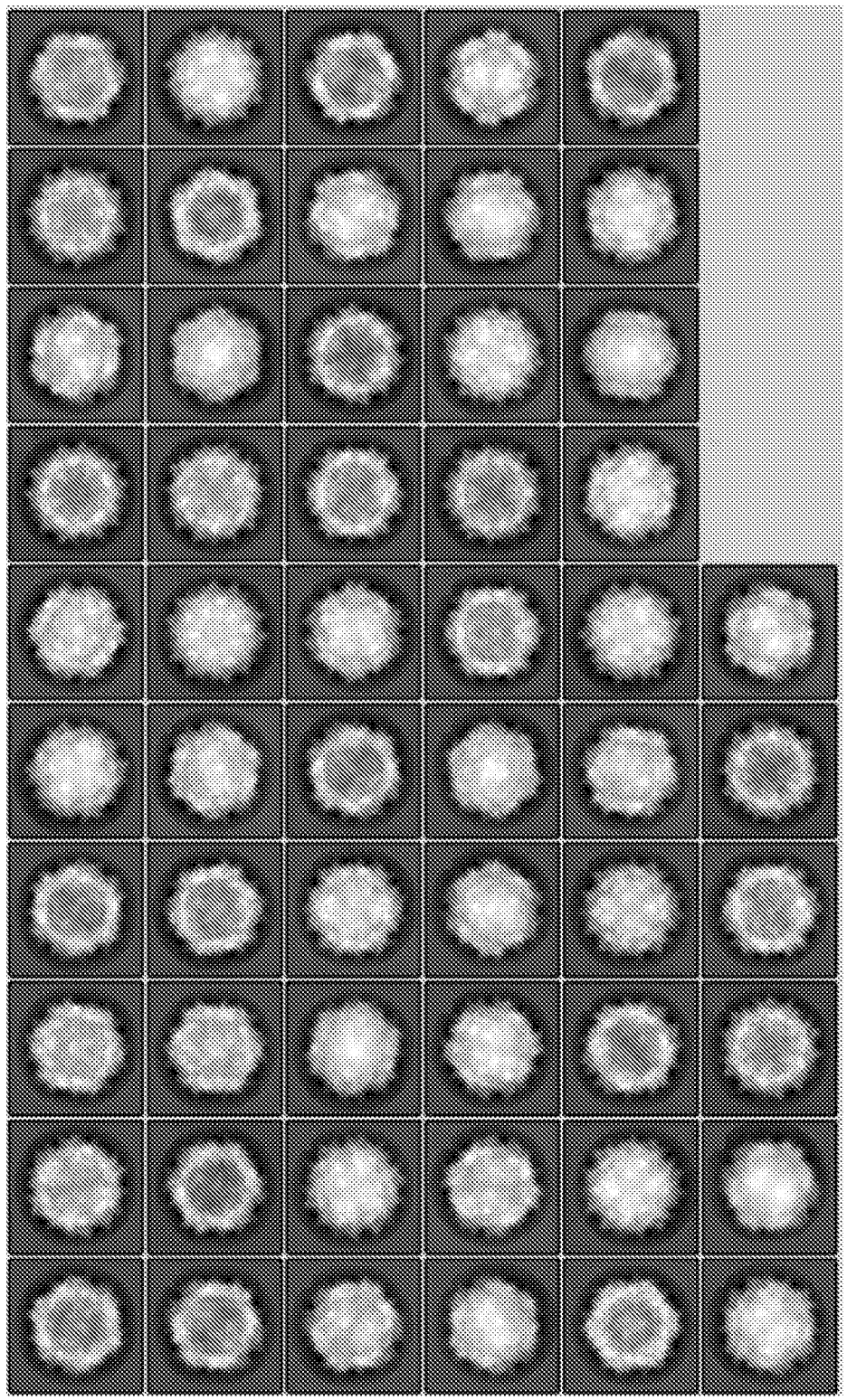
FIGS. 5A-5C show 2D classification analysis of sample 2.
Figure 5B:
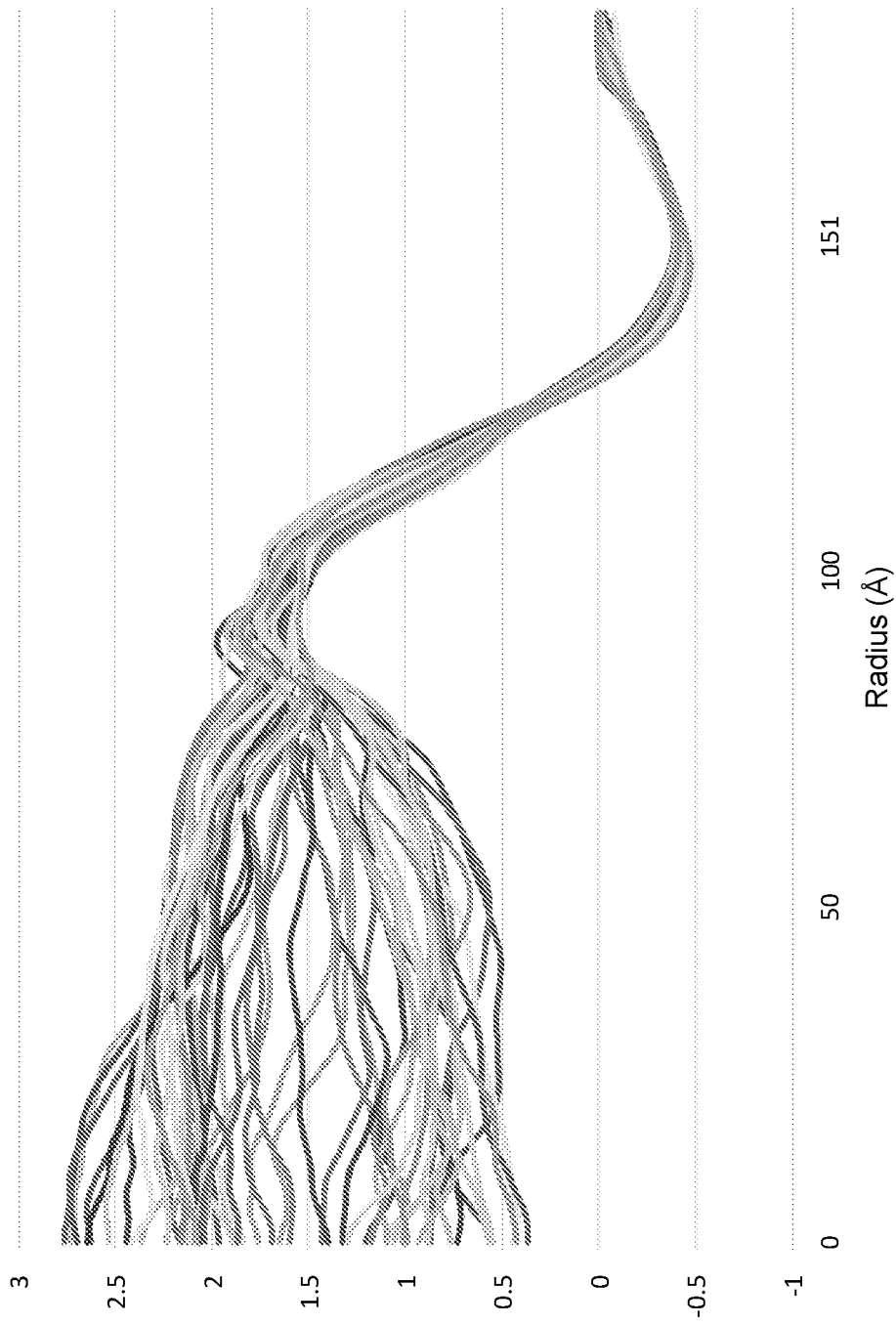
Figure 5C:
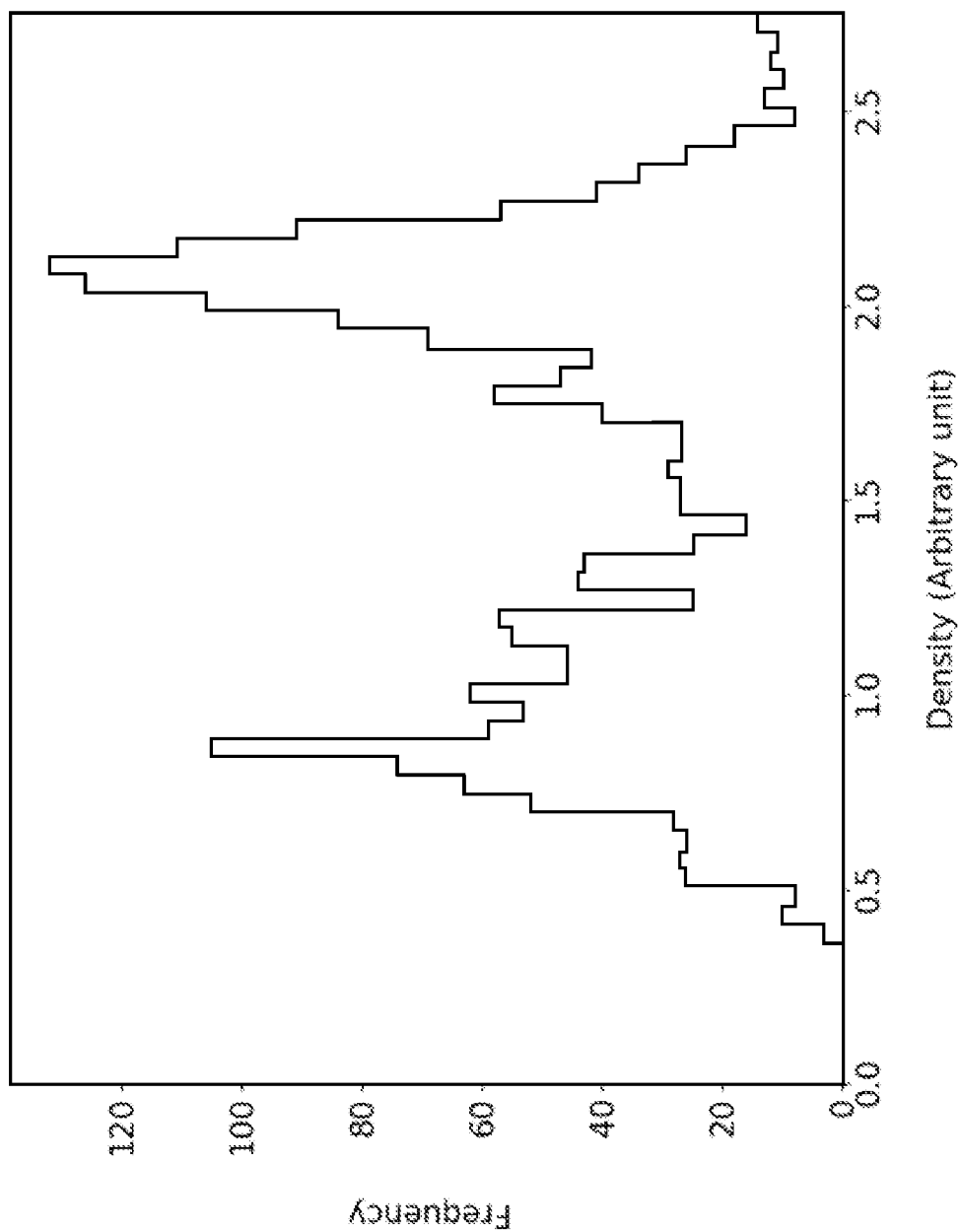
Figure 6:
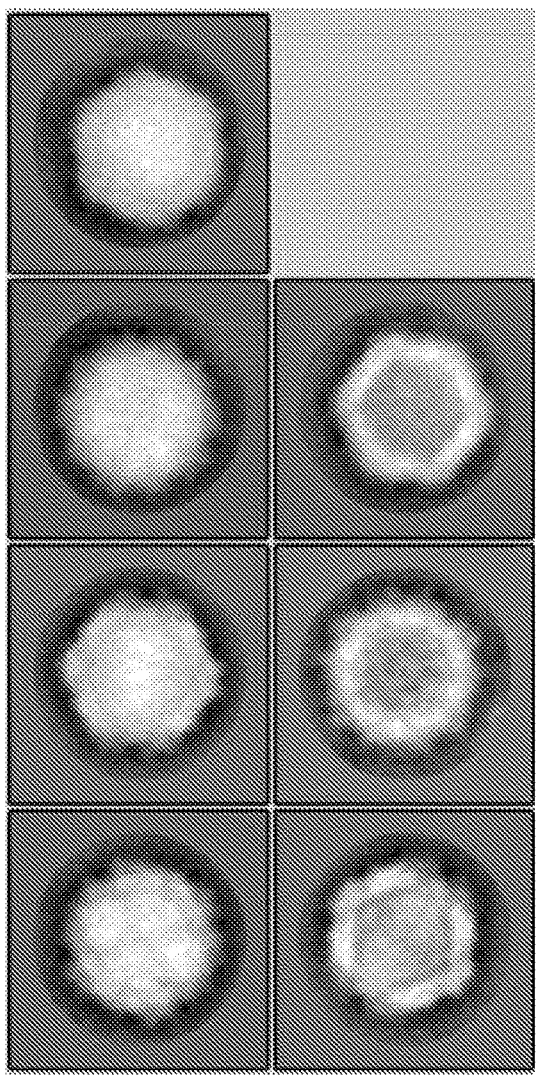
FIG. 6 shows 2D class averages generated with about 700 AAV particles which resulted in noisy classes that were not readily resolvable into full and empty populations.

In order to simulate the variability in proportion of genome-filled particles that occurs in large-scale AAV preparations, another AAV3 sample (sample 2), which was purified using a different method, was added to the analysis (FIGS. 5A, 5B, and 5C, see below). Both AAV3 datasets (sample 1 and 2) contained a little over 100,000 particles, sufficient for solving near-atomic resolution structures but well in excess of the needs for generating the 2D and 3D classes that allow measuring capsid populations. Hence, in order to assess a minimum particle count for such measurements, five random subsets of particles ranging in number from 1000 to 20,000 were selected. A minimum of 1000 particles was determined empirically, since fewer particles produced classes that were poorly centered and noisy, making it more difficult to assign full and empty (FIG. 6). 2D classification was performed for each subset of particles using two different software packages, RELION 2.1 and cryoSPARC, in order to test for bias in proportion estimation between software programs.

Statistical analysis of sub-samples (FIG. 3) showed that the estimated percentage of full particles was unrelated to sampling effort (P=0.27), differed between the two samples as described above (mean percentage full=23 vs 62% in these samples, P<0.0001), and varied only slightly between the two classification programs (mean % full particles=44 in RELION vs 41 in cryoSPARC sampled; P<0.0001) (Table 4, see below). There was no interaction between sample and program (P=0.39). Variance in the estimated percentage of full particles stabilized when the total number of particles sampled exceeded 5,000 to 10,000 (FIG. 3A) for both samples. Program-wise comparison of percentage full particles also showed the same effect (FIGS. 3B, 3C).

In order to generalize the relationship between the virus sample characteristics and the minimum number of particles needed to confidently characterize it, the state of a capsid was modelled as a random variable (X) which can either be functional (full) or non-functional (empties and intermediates) (see below). According to the resulting model, the minimum number of particles 'n' required for a given confidence level 'C' and tolerance level 'm' was derived (see eqn. (7) below) whose commonly used values are given in Table 1. For example, if the required confidence level is 95% (C=0.95) and tolerance level=1% (m=0.01), by using $$n = \frac{(\mathrm{erf}^{-1}(C))^2(1-4m^2)}{2m^2}$$

where 'n' can be calculated as 9600. Hence, upon collecting data on 9600 particles and sorting them into 2D classes, the researcher can be at least 95% certain that the proportion in the original preparation (p) is within 1% range of the calculated sample proportion.

TABLE 1

| C | m | | | | | | |
|---|---|---|---|---|---|---|---|
|  | 0.1% | 0.20% | 0.50% | 0.75% | 1.0% | 1.5% | 2% |
| 95% | 960361 | 240087 | 38411 | 17069 | 9600 | 4264 | 2397 |
| 96% | 1054467 | 263614 | 42175 | 18742 | 10540 | 4682 | 2632 |
| 97% | 1177318 | 294326 | 47088 | 20925 | 11769 | 5228 | 2939 |
| 98% | 1352968 | 338238 | 54114 | 24047 | 13524 | 6008 | 3377 |
| 99% | 1658718 | 414674 | 66342 | 29482 | 16581 | 7365 | 4140 |
| 99.9% | 2706881 | 676712 | 108265 | 48112 | 27058 | 12020 | 6756 |
| 99.99% | 3784161 | 946029 | 151352 | 67259 | 37827 | 16803 | 9445 |

Table 1 shows a number of values of 'n' which shows the number of particles that need to be analyzed with a given confidence interval (C) and tolerance (m) to estimate the proportion of genome-filled AAV in any vector preparation with a binary particle model (functional vs non-functional).

Figure 7:
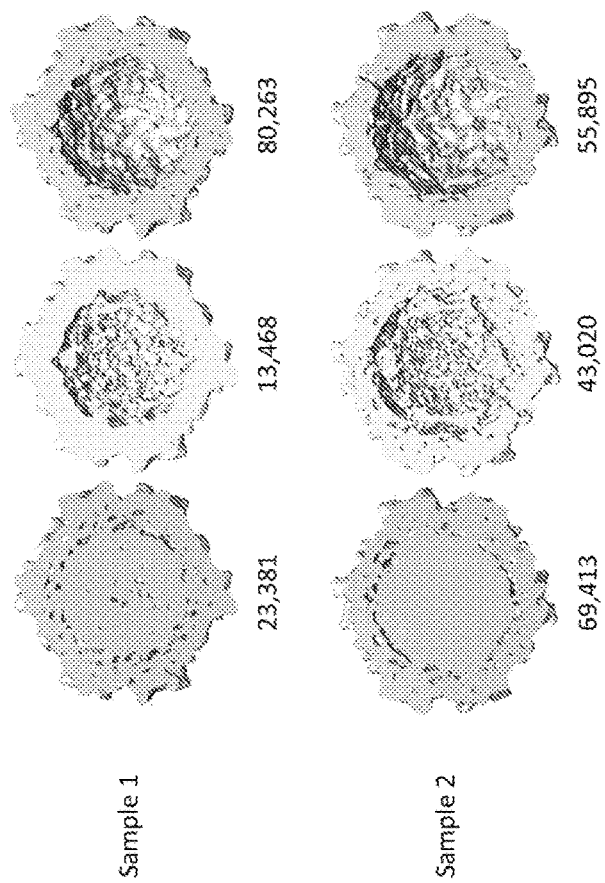
FIG. 7 shows three distinct classes that were separated using 3D classification. The corresponding maps are shown surface rendered and illustrate genome-filled (purple, left-hand samples in each row), partially-filled (green, center samples in each row), and unfilled classes (pink, right-hand samples in each row) with the number of particles, in both samples.

Determining the Proportion of Full vs. Empty Capsids by 3D Classification of Cryo-EM Images Though the 2D class averages of sample 1 separated into distinct populations (FIG. 2B), the genome-filled population of sample 2 had a broader distribution of density (FIG. 5B). Hence, 3D classification analysis was performed with a reference model made from the particles in order to better separate the particles according to their genome density. The 3D classification was performed without imposing any symmetry (C1), as partial genome density could be averaged out by imposing icosahedral symmetry. The resulting 3D classes (FIG. 7) revealed the presence of empty, full, and intermediate genome density populations. Sample 1 contained 19.96% full capsids and 80.04% empty capsids ('empty' being used here to refer to a combination of unfilled and partially filled capsids) and sample 2 contained 41.24% full and 58.76% empty capsids. Analytical ultracentrifugation (AUC) was used as an independent method to cross correlate the findings of cryo-EM and the results are reported in Table 2. Thus 3D classification of cryo-EM images is well-suited to measuring the proportion of genome-filled and empty capsids and will detect differences resulting from different preparation methods.

TABLE 2

|  | Sample 1 | | Sample 2 | |
|---|---|---|---|---|
| Analysis | Full | Empty | Full | Empty |
| 3D classification | 19.96% | 80.04% | 41.24% | 58.76% |
| Analytical Ultracentrifugation (AUC) | 12.66% | 87.34% | 42.41% | 57.59% |

Table 2 shows a comparison of proportion of full and empty capsids as evaluated by cryo-EM 3D classification and AUC.

Figure 4:
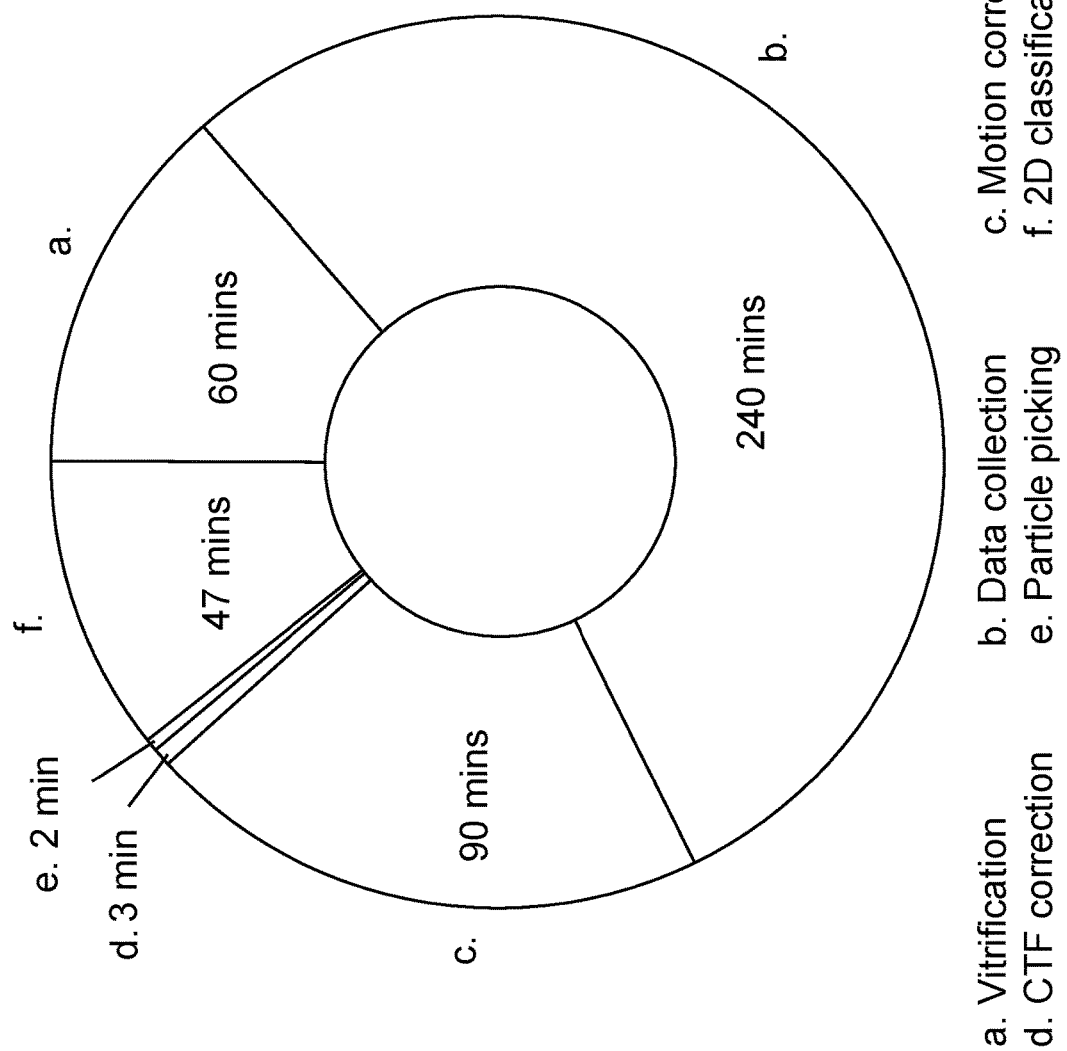
FIG. 4 shows a breakdown of time involved in grid preparation, imaging and data processing for 25,517 particles that are sufficient for determining a robust estimate of the proportion of particle populations.

Time and Cost Analyses Reveal Cryo-EM as a Viable Option for Determining the Proportion of Genome-Filled and Empty Capsids For practical purposes, 99% confidence with 1% tolerance is considered for which 16,851 particles need to be sampled (Table 3). From previous data collections, at 59,000× magnification, at a pixel size of 1.136 Å, data was collected with an average of 150 particles per micrograph (FIG. 8) when a purified AAV sample of 2 mg/ml concentration is applied to a Quantifoil R2/1 grid coated with a thin film of continuous carbon. Under these conditions, recording 150-200 micrographs was sufficient to collect ~20,000 particles. The total time required, including vitrifying grids, data collection, and data processing with RELION 3.0, is represented in FIG. 4. Motion correction for 157 micrographs with Motioncorr2 program took 1.5 hours, from which a total of 25,517 particles were picked using RELION autopicking function. The total data processing time was less than 4 hours with two 2.3 GHz Intel Xeon CPUs combining 64 cores, 384 GBs memory, 2TBs of SSD scratch space, and two NVIDIA Titan Xp GPUs. The total costs for sample screening, data collection, and data processing are reported in Table 3. Data collection costs vary from instrument to instrument, but the values reported are representative.

TABLE 3

|  | Internal Users | External Academic | Industry |
|---|---|---|---|
| Consumables* | 48.50 | 77.00 | 80.00 |
| Vitrification | 60.00 | 122.29 | 140.00 |
| Cryo-EM data collection (4 hours) | 338.32 | 540.80 | 800.00 |
| Staff time | 275.04 | 439.68 | 480.00 |
| 4 hours processing | 200.00 | 400.00 | 460.00 |
| Total | 921.86 | 1579.77 | 1960.00 |

*includes c-clip/ring, grids, storage box

Table 3 shows costs in USD to prepare, image, and analyze a sample of appropriate purity and concentration.

Quantification of AAV vectors are currently being performed by ELISA, qPCR, optical density measurement, charge detection mass spectrometry (CDMS), sedimentation velocity analytical ultracentrifugation (SV-AUC), negative stain TEM, etc., with negative stain TEM being the only visual determination. The optical density method determines the nucleic acid-to-protein ratio in the preparation by measuring the absorbance of the sample at 260 nm and 280 nm. The absorption ratio, A260/A280, varies depending on the proportion of full to empty particles and is often verified by ELISA, which is used to quantify the total number of capsids, and qPCR, which is used to detect the genome levels. One of the major drawbacks of this method is that the presence of protein and nucleic acid impurities in the sample could result in incorrect estimations in addition to requiring high concentrations of virus capsids. Both CDMS and SV-AUC are analytical methods capable of quantitatively assessing empty, partially-filled, and full populations. However, these methods have not been used widely due to the fact that they require significant amount of sample, are time-consuming, are not widely available, and do not lend themselves easily to higher throughput analysis.

One of the major advantages of cryo-EM compared to the other techniques mentioned above is that impurities and other background protein do not interfere with the quantification because they are eliminated during data processing. For example, protein contaminants or disintegrated capsid proteins can contribute to signal in optical density measurement or ELISA, depending upon the antibody used, but any cryo-EM 2D class average that does not represent stable AAV particles is eliminated. Though there is a possibility that noise may be introduced during automated particle picking by erroneous selection of background, these wrongly selected areas are eliminated by user supervision which includes particle sorting and using manually picked particles as an initial template. In negative stain TEM there is a possibility of the heavy metal stain penetrating the empty capsids, which makes them indistinguishable from the genome-filled capsids. Additionally, capsids may be disrupted by dehydration in the microscope vacuum, neither of which occur in cryo-EM.

Figure 3A:
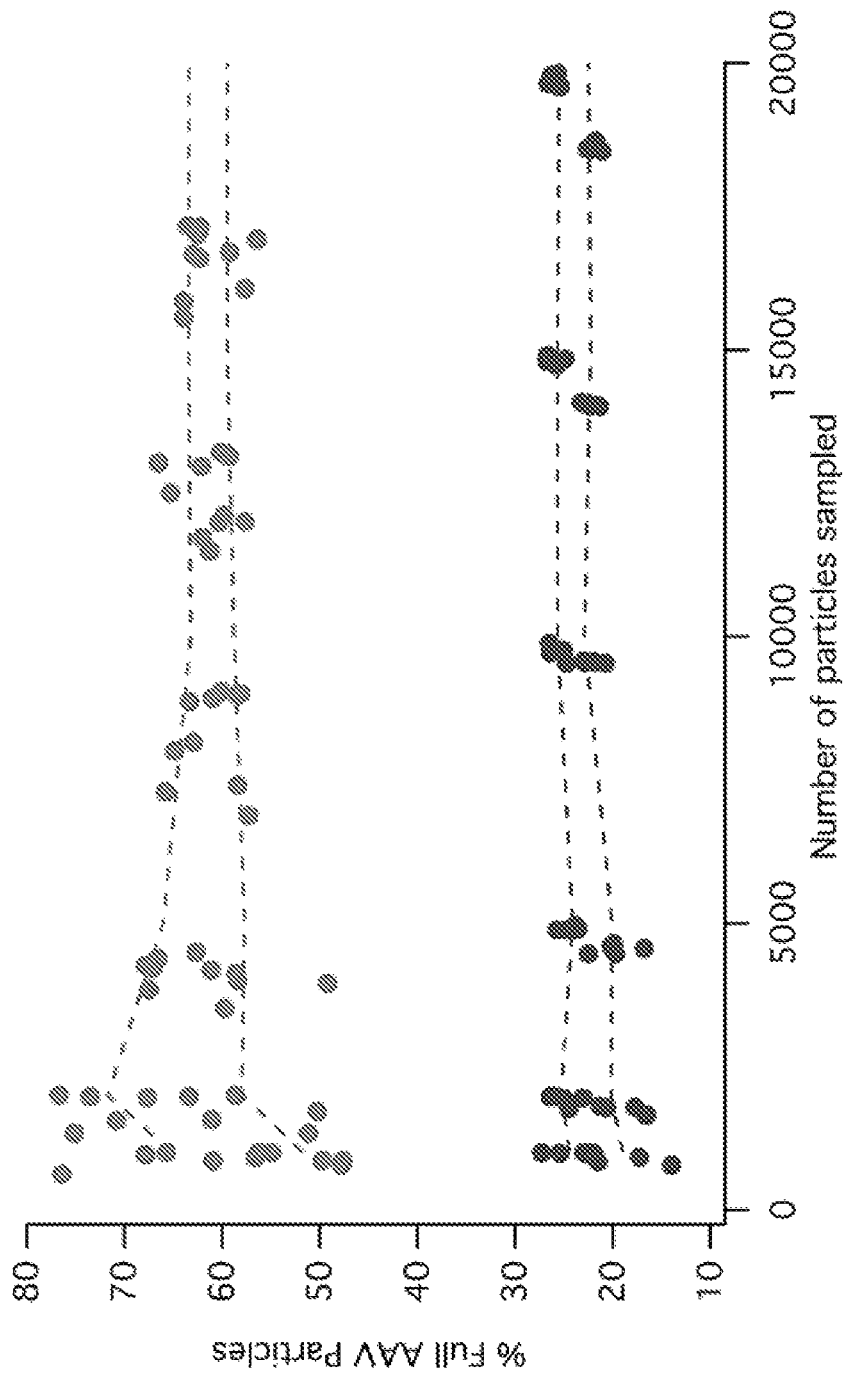
FIG. 3A shows percentage of full virus particles as a function of the number of particles in subsamples of a larger data collection. Data points from sample 1 are represented in blue (lower grouping) and sample 2 in red (upper grouping). Dotted lines connect the upper and lower 95% confidence interval for the mean at each targeted number of particles in the subsamples. Results from both analysis programs are pooled in this plot.
Figure 3B:
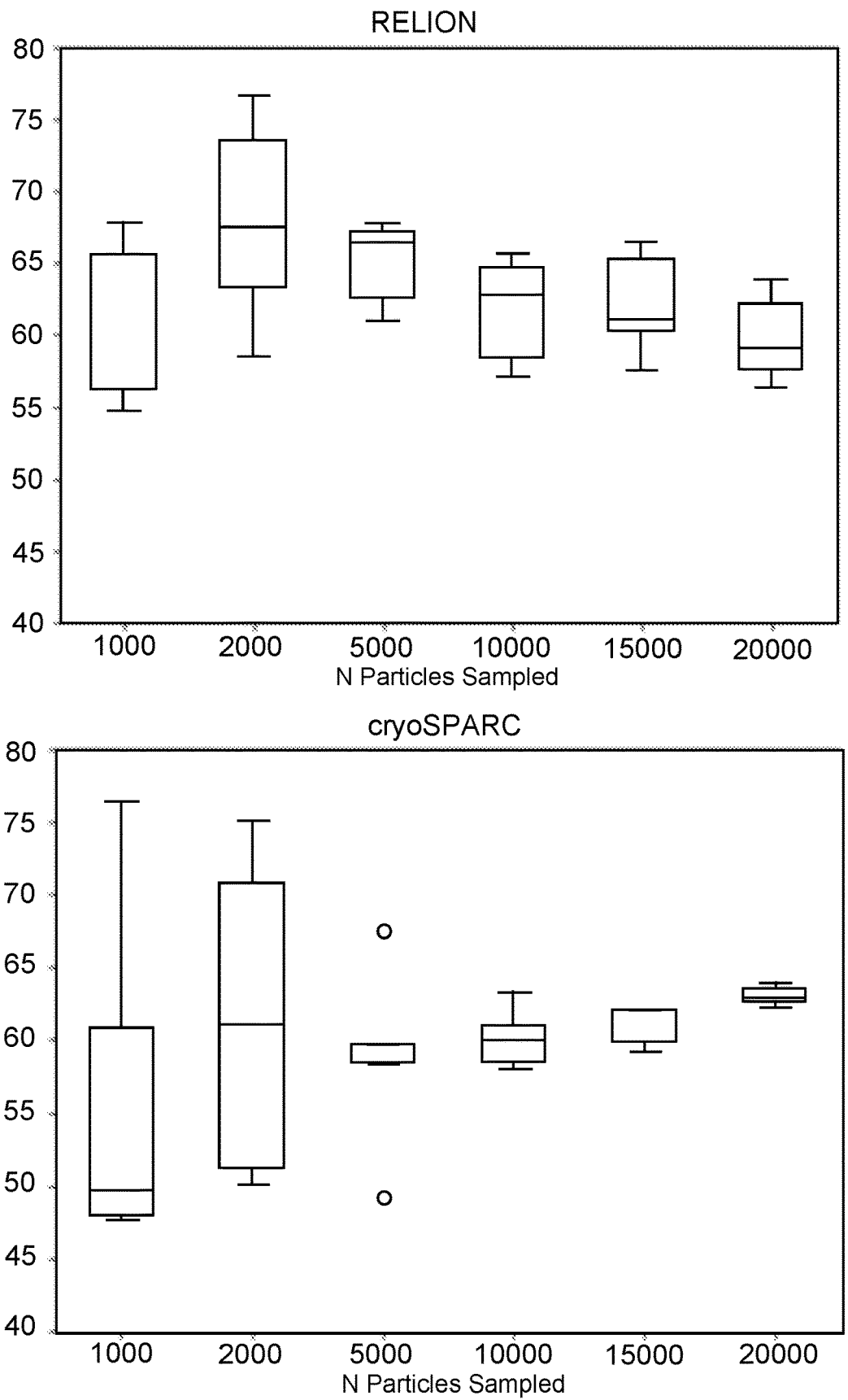
FIGS. 3B and 3C show box-plots which compare RELION and cryoSPARC analyses of the two samples (the box-plots of FIG. 3B are from sample 2, the box-plots of FIG. 3C are from sample 1). Bottom, middle, and top line of the box represents first quartile, median, and third quartile, respectively, and bottom and top whiskers represent the maximum and minimum value, respectively.
Figure 3C:
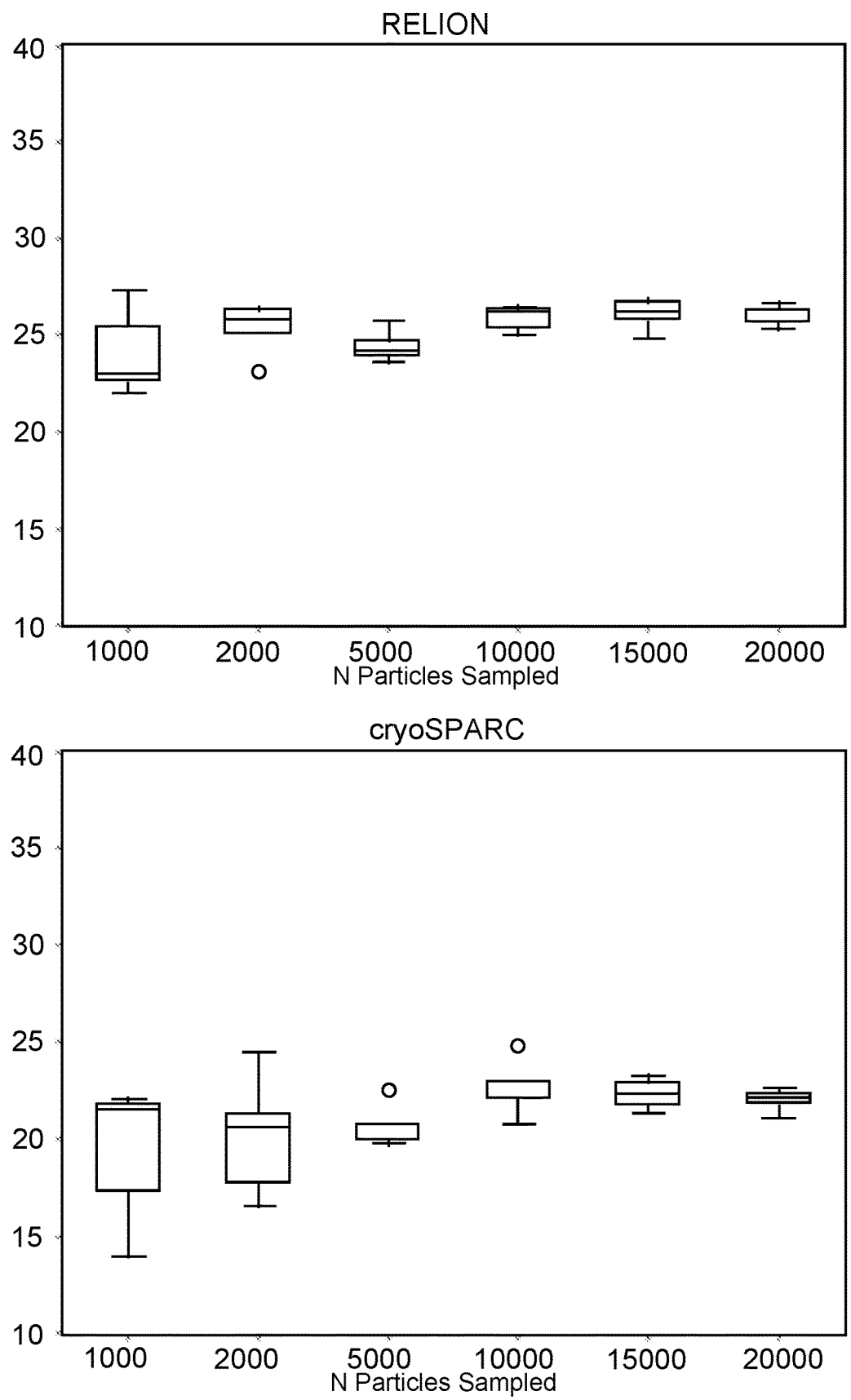

The analysis combined reference free 2D classification to calculate the minimum number of particles required for proportion calculation and 3D classification to quantify DNA density. 2D classification served well to perform initial classification of vectors into genome containing and empty particles (FIGS. 2B, 2C, 2D), and illustrated that variance decreased with increase in particle number irrespective of sample proportion (FIGS. 3A, 3B, 3C). However, 3D classification analysis was required to assign functional or non-functional status of vector without ambiguity. By proceeding to 3D classification, it was possible to thoroughly analyze not only the presence or absence of DNA, but also particles whose density lay in between that of full and empty (FIGS. 5A, 5B), which indicates the presence of a population of capsids that packaged partial genome, which has been previously observed with other methods as well.

Since 3D classification requires a 3D reference model, one might be concerned about reference bias. But programs like RELION employ low-resolution references, low pass filtered to ~60 Å resolution, which are devoid of detailed structural information in order to avoid reference bias. Another issue might be the overestimation of a majority population in comparison to the minority population, especially for the present purposes, where vector preparations are subjected to a variety of separation processes in order to enrich for full AAV. Though the sorting of heterogeneous particles into their respective homogeneous classes is dependent on the extent of difference between the populations, overestimation can be minimized by resorting misclassified particles with iterative rounds of 3D classification. Moreover, 3D classification has proven to be a robust and sensitive scheme as it is capable of classifying heterogeneous populations below 5%, even as low as 0.8% of total particles in some cases.

New cryo-grid preparation techniques may further enhance the throughput and cost-effectiveness of using cryo-EM and 2D classification to measure capsid populations. One example is the Spotiton plunge-freezer that allows more than one sample to be vitrified on the same grid, reducing the cost and time for grid preparation, the cost of materials including sample and grids, and saving microscope time used for switching grids. Developments in analysis algorithms moving towards decreasing user-supervision and processing time, computational hardware including GPU-based calculations, and access through cloud computation services will further increase efficiency as well as availability of this technique for new classes of user. Due to the broad applicability of this method, it can be used with other viral vectors such as adenoviruses or lentiviruses to visualize effective transgene packaging and in case of lipid nanoparticles that are used to transport drugs.

While many of the examples disclosed herein are presented using virus capsids, the disclosed techniques are generally applicable to a variety of particles. Thus in various embodiments, the procedures disclosed herein may be used to analyze a variety of particles at the nanoscale that serve as carriers in case of drug delivery or gene delivery systems. Similarly, while many of the examples disclosed herein refer to a genomic filling material in the particles, in various embodiments the filling materials may include nucleic acid material (e.g. various polynucleotides such as DNA or RNA which may include genomic material), small molecules (e.g. pharmaceuticals or other organic compounds), and/or amino acid materials (e.g. peptides or proteins including antibodies or antibody fragments). For example, the procedures may be used to:

Distinguish functional viral particles that have packaged the full genome from non-functional viral particles that have packaged either an erroneous partial genome or which remain unpackaged in any given sample, where these viral particles may be types used in gene therapy such as adenovirus vectors, lentivirus vectors etc.;

Analyze the variations in particle size and particle morphology;

Estimate the proportion of drug-filled liposomes used in drug delivery to tumors or other affected sites;

Monitor genome containing capacity of gene therapy vectors packaged with a gene of interest over a period of time, i.e. upon purification, storage, and before administration (see below); and Analyze the contents of silica-based nanoparticles containing anti-cancer drug carriers used in treatment.

The following is a description of particular materials and methods of embodiments of the procedures.

AAV3 Propagation and Purification

Large-scale polyethylenimine transfections of AAV cis, AAV trans, and adenovirus helper plasmids were performed in a ten-layer hyperflask (Corning) with near-confluent monolayers of HEK293 cells. Plasmids were transfected at a ratio of 2:1:1 (260 µg of adenovirus helper plasmid/130 µg of cis plasmid/130 µg of trans plasmid). PEI Max (Polysciences)/DNA ratio was maintained at 1.375:1 (w/w). Downstream purification of sample 1 was performed by affinity chromatography using AVB sepharose HP (25-4112-11, GE Healthcare) and that of sample 2 was performed by tangential flow filtration and ultracentrifugation as previously described. DNase-I-resistant vector genomes copies were used to titrate AAV preparations by TaqMan qPCR amplification (Applied Biosystems 7500, Life Technologies) with primers and probes detecting promoter, transgene, or poly-adenylation signal coding regions of the transgene cassette. The purity of the large-scale preparations was evaluated by SDS-PAGE gel electrophoresis.

Titan Krios Data Collection (Sample 1)

3 μL of the sample was applied to freshly glow-discharged Quantifoil R2/1 grids (Quantifoil Micro Tools, GmbH, Jena, Germany) which were then blotted and vitrified in liquid ethane using an FEI Vitrobot Mark IV (Thermo Fisher Scientific, Waltham, MA). Images were acquired on the Thermo Fisher Titan Krios G3 microscope operated with an accelerating voltage of 300 kV. An 'Atlas' image was assembled from micrographs taken at 165× magnification in linear mode on a Thermo Fisher Falcon 3ec direct electron detector, and suitable areas were selected for data collection. Automated data collection was set up using Thermo Fisher's EPU software. Images were collected on the Falcon 3ec in counting mode using a nominal magnification of 59,000×, resulting in a calibrated pixel size of 1.136 Å at the sample. The microscope was operated with a 70 μm condenser aperture and a 100 μm objective aperture. Four non-overlapping exposures per 2-μm-diameter hole were acquired with the beam in parallel mode. Total dose per exposure was set at 45 e-/Å$^2$.

Polara Data Collection (Sample 2)

Grid preparation and data collection on an FEI Polara G2 microscope (Thermo Fisher Scientific, Waltham, MA) was carried out similarly to that described above for the Krios. The Polara was operated at 300 kV and a nominal magnification of 115,0000× with defocus values ranging from −1.5 to −4.0 μm. Images were collected under the software control of Thermo Fisher's EPU program using an FEI Falcon 2 direct electron detector with post-column magnification of 1.4× yielding a calibrated pixel size at the sample of 0.93 Å. The microscope was operated with a 70 μm condenser aperture and no objective aperture.

Data Processing

For both datasets, all movie frames were aligned using Motioncor2 program using 5 by 5 patching. CTF estimation was performed using Gctf program. Particle picking was performed by RELION autopicking using the 2D class averages of ~1000 manually picked particles as templates. A total of 132,631 particles were picked from the Titan Krios dataset and 169,181 particles were picked from the Polara dataset. The random subsets of particles were created using the 'shuffle' command in LINUX from the total 'particles.star' and these were processed using the 2D classification programs in RELION 2.1 and cryoSPARC. Proportions of full and empty particles were calculated from 3D classification analysis from RELION 2.1, imposing C1 symmetry.

Image Processing, Fitting, Radial Analysis, and Density Histograms

The maps and fittings were rendered in UCSF Chimera and model building was performed with Coot. The models were refined against the density maps using PHENIX 'real space refine' and the refined structures were validated using MolProbity. Local resolution estimations were performed using RELION. Density along the radius of each 2D class average was calculated using the 'bradial' program of the BSOFT software. A step size of 2 was used and hence the density at every 2.272 Å (twice the pixel size) of sample 1 and every 1.86 Å of sample 2 was plotted. The background subtraction option was used to reduce any background noise from the 2D class averages. Internal density histograms were generated using PYTHON programming to visualize the frequency of each DNA density value which corresponded to the distance 0-75 Å. Based on the peaks displayed in the histograms, the density range for empty, intermediate, and full populations were defined as 0-0.5, 0.5-1, and 1-1.5, respectively.

Statistical Analyses

The percentage of full particles in random subsamples was used as the response variable in a least squares linear model (JMP 13.1, SAS Institutes) to determine how the estimate varied with sample, the number of particles examined, construction program, and sample by construction program interaction. Least squares means from this model, representing estimates at the mean subsample size (N particles=8310), were used to estimate effect sizes.

Analytical Ultracentrifugation

The vector samples were analyzed in 1× PBS-0.001% Pluronic F68. The ultracentrifugation was performed using cells containing two-sector assemblies in an eight chamber An50-Ti rotor spinning at 12,000 rpm in a Beckman Coulter Proteome Lab XL-1 ultracentrifuge. One sector of the cell contained 430 μL 1× PBS-0.001% Pluronic F68 reference solution; the other sector contained 400 μL of vector in 1× PBS-0.001% Pluronic F68 with an absorbance at 280 nm of 0.2-0.8. The scan data were recorded at 280 nm.

The scan data were fit to a Continuous c(s) Distribution model using SedFit with regularization by $2^{nd}$ derivative over a range of 0-500 s a frictional ratio of 1.0 and an F-ratio confidence level of 0.95. The peak identity was determined based on a previous method. The molar quantity of each species was determined by calculating the respective molar extinction coefficients. For empty particles, the ε280(capsid) was calculated to be 6337200 $M^{-1}$ $cm^{-1}$. For full particles, the ε280(vector) was calculated from the equation below, which was modified from an earlier procedure to reflect differences in dsDNA vs. ssDNA:

$$\varepsilon 280(vector) = 15.9 \times MWDNA + \varepsilon 280(capsid)$$

The continuous distribution plots revealed the presence of a peak with a sedimentation coefficient intermediate to that of the Empty (E) and Full (F) particles. It has been demonstrated that this corresponds to particles with smaller DNA fragments packaged in the capsid.

Data Availability

Cryo-EM maps were deposited into the EM data bank under accession numbers EMD-20624 (empty) and EMD-20625 (full).

Loss of Packaged Non-Native Genome Over Time in Cold Storage

Figure 12:
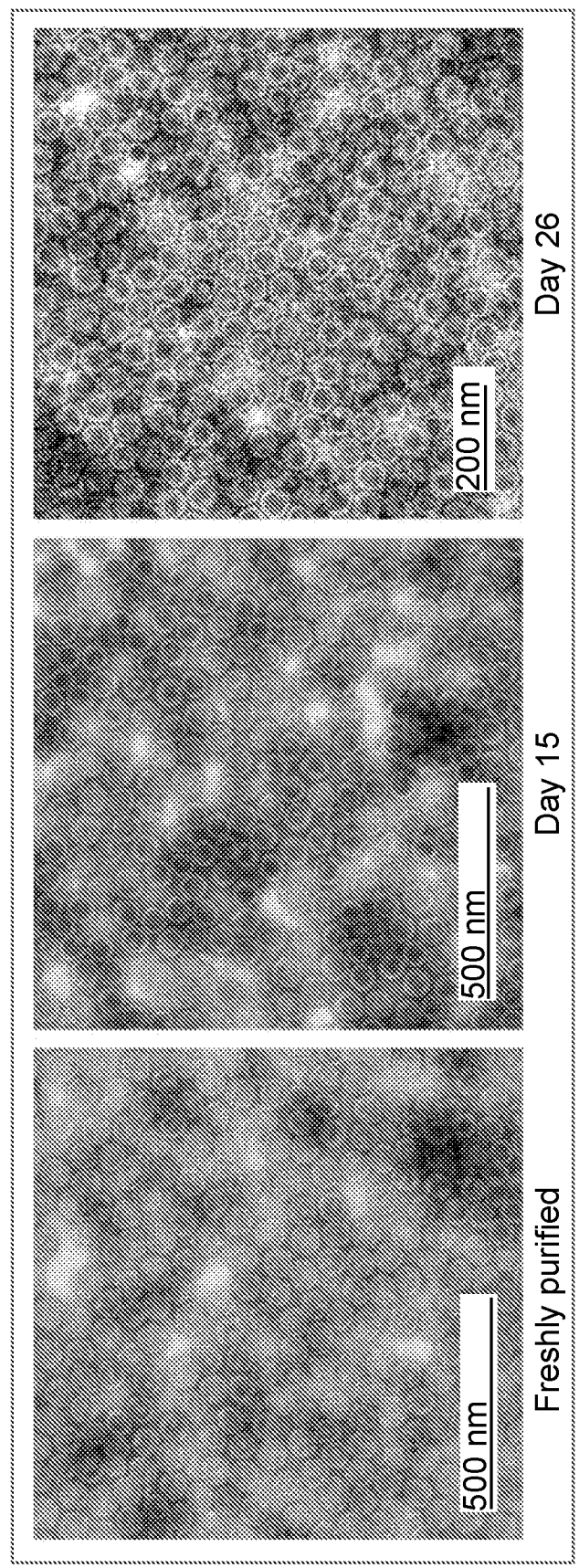
FIG. 12 shows negative stain TEM images comparing genome-containing HPV16 capsids immediately after purification ("Freshly purified," left panel) and 15 days (middle panel) and 26 days (right panel) after purification, illustrating that the capsids lose packaged non-native genome in storage at 4° C.

A variety of viruses employ packaging signals in order to distinguish host genome from their own genome during genome packaging stage of the replication cycle. Researchers have identified and utilized this signaling mechanism to their advantage in research, by packaging non-native genome into a capsid of interest. Viral vectors packaged with a gene of interest are used in gene therapy, and in other cases pathogenic viruses are assembled with a mock genome that renders them noninfectious or simplifies the in vitro system of virus purification. Though it is known that signals are involved in genome packaging, the mechanism of capsid-genome interaction and how the nucleotide sequence affects this process is largely unknown. Previous studies with Adeno-associated virus (AAV), a gene therapy vector, have shown that capsids when packaged with a non-native genome resulted in increased defective packaging or empty capsids when compared to viruses packaged with the native genome. Results are provided (FIG. 12) which show in the case of human papillomavirus 16 (HPV16) pseudovirus packaged with cottontail rabbit papillomavirus (CRPV) genome that the packaged non-native genome is gradually lost upon storage at 4° C. and all capsids are empty by the end of 26 days after purification.

Determination of Minimum Number of Particles Needed

The following is a description of embodiments of procedures for determining a minimum number of capsid particles that need to be included in a sample.

The state of a virus capsid is a random variable (X) and it can be either functional (DNA-filled) or non-functional (empty or partial DNA) with probability of being full assigned as 'p' (the proportion of full particles in any given preparation) and the state of any two random particles being mutually independent. 'X' has a value of 1 when the particle is full and 0 for the remaining, following a Bernoulli distribution with the properties below:

$$P(X=1)=p$$

$$P(X=0)=1-p$$

P(A) describes the probability of occurrence of event 'A'. The mean and variance of X is, $$\text{Mean}(X)=p$$

$$\text{Variance}(X)=p(1-p)$$

The proportion of full particles in a randomly drawn sample can be defined as a random variable as shown below $$S_n = \frac{\sum_{i=1}^{n} X_i}{n}$$

Where,
$S_n$=Proportion of full particles in a random sample of size 'n'
$X_i$=Bernoulli random variable denoting the state of the $i^{th}$ particle In cases where 'n' is large, the Central Limit Theorem enables us to approximate the distribution of Sn to a normal distribution with:

$$\text{Mean}(S_n) = p \quad (1)$$

$$\text{Variance}(S_n) = \frac{p(1-p)}{n} \quad (2)$$

A conventional rule for this to hold is when n(p)>10 and n(1−p)>10.

A normal distribution with mean 'μ' and standard deviation 'σ' is a symmetric distribution with the following probability density function (PDF):

$$f(x \mid \mu, \sigma^2) = \frac{1}{\sqrt{2\pi\sigma^2}} e^{\frac{-(x-\mu)^2}{2\sigma^2}}$$

The probability of finding a random value within the interval [μ−zσ, μ+zσ], is given by the corresponding area under the PDF:

$$\int_{\mu-z\sigma}^{\mu+z\sigma} \frac{1}{\sqrt{2\pi\sigma^2}} e^{\frac{-(x-\mu)^2}{2\sigma^2}} dx = \text{erf}\left(\frac{z}{\sqrt{2}}\right)$$

where er f(•) represents the Gauss error function.

For example, if the value of this integral is 0.95, it indicates that any random value drawn from this distribution will fall within the interval [μ−zσ, μ+zσ] in 95% of the cases. This value is referred as the confidence level and the corresponding interval is the confidence interval. For any given confidence level 'C', the value of 'z' can be derived as, $$\text{erf}\left(\frac{z}{\sqrt{2}}\right) = C \quad (3)$$

$$z = \sqrt{2} \; \text{erf}^{-1}(C)$$

where er $f^{-1}$(•) refers to the inverse error function.

Using (3) a z-value can be derived for any confidence level between 0 and 1. For example, at a 95% confidence level (C=0.95), the corresponding z-value will be approximately 1.96. From (1) and (2), μ and σ for $S_n$ would be:

$$\mu = p$$

Which is the proportion of full particles in the original preparation.

$$\sigma = \sqrt{\frac{p(1-p)}{n}}$$

And, 'z' is calculated using (1) for a chosen confidence level 'C'.

If the actual proportion of full particles in the random sample of 'n' particles is 'k', it can be said with confidence level 'C' that 'k' would lie within the interval $$\left[ p - z\sqrt{\frac{p(1-p)}{n}}, \; p + z\sqrt{\frac{p(1-p)}{n}} \right]$$

and correspondingly 'p' would be within the interval $$\left[ \frac{2kn + z^2}{2(n+z^2)} - m, \; \frac{2kn + z^2}{2(n+z^2)} + m \right] \quad (4)$$

where, $$m = \frac{z\sqrt{4nk(1-k) + z^2}}{2(n+z^2)} \quad (5)$$

Therefore, the interval estimate of 'p' would be (4) and the point estimate of 'p' would be the mid-point of interval (4), which is $$\hat{p} = \frac{2kn + z^2}{2(n+z^2)}$$

Under normal experimental conditions $z^2$ is negligible compared to 'n' (number of particles collected). Thus, the point estimate can be approximated to the sample proportion 'k' as shown below.

$$\hat{p} = \frac{k}{1+\frac{z^2}{n}} + \frac{\frac{z^2}{n}}{2\left(1+\frac{z^2}{n}\right)} \approx k$$

The length of the interval estimate (4) is determined by 'm' which is the tolerance level. Once the tolerance level is set, the relation between number of particles in the sample 'n' and tolerance 'm' can be derived from (5) as, $$n = \frac{z^2\left(k(k-1) + \sqrt{k(1-k)(k(1-k)-4m^2)} + m^2\right) - 2m^2}{2m^2} \quad (6)$$

Since the goal is to determine the minimum number of particles required for obtaining a reliable estimate for 'p', one cannot calculate 'k' until a dataset is collected. Instead, the maximum possible value of 'n' can be calculated for the desired tolerance 'm' and confidence level 'C'.

Since 'k' is the only variable in (6) and 'k', 'm' & 'z' are positive real numbers, the value of 'n' can be maximized by maximizing k*(1−k).

Figure 9:
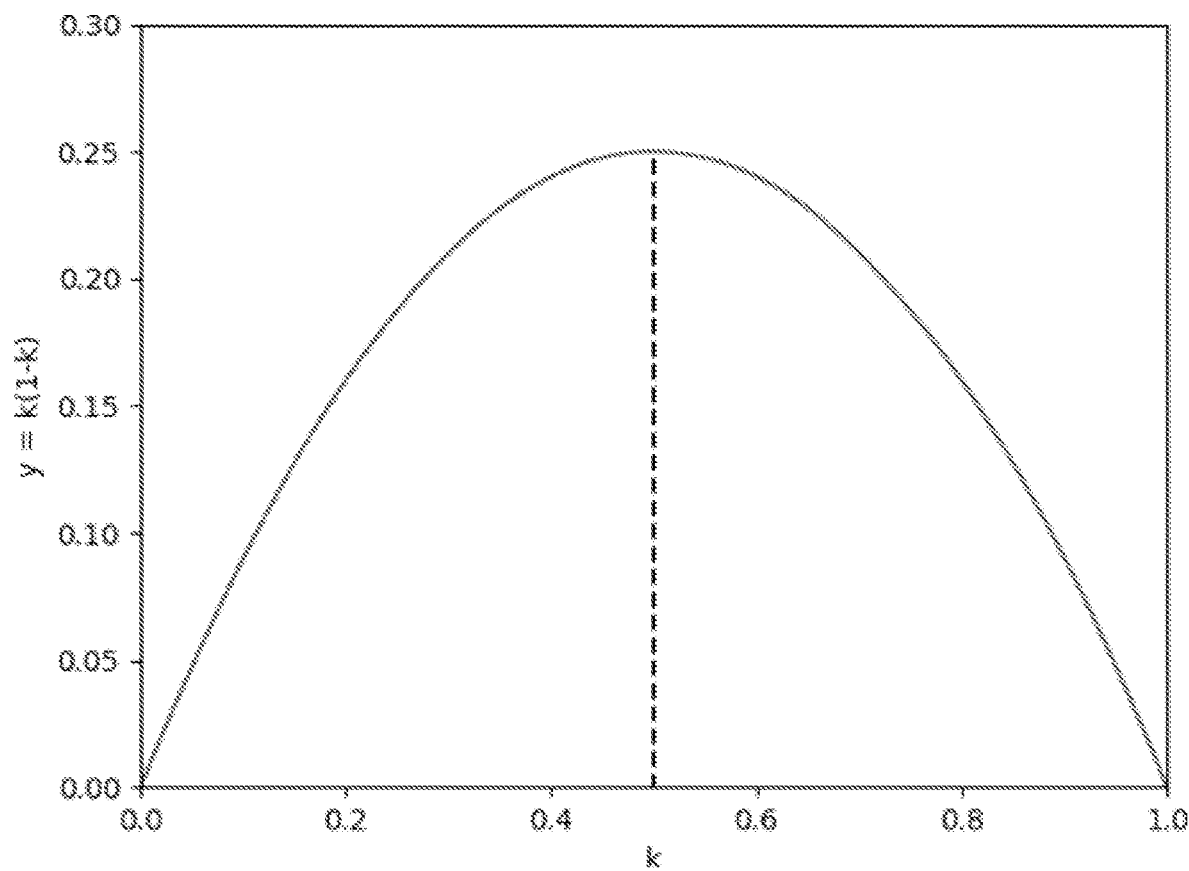
FIG. 9 shows a graph which illustrates the function $y=k*(1-k)$ and the point of maxima for the function occurs when $k=0.5$ and is shown in dotted lines.

The point of maxima for the function y=k*(1−k) can be identified by plotting its graph. It can be seen that the point of maxima occurs at k=½ (FIG. 9) and by substituting k=½ and the value of 'z' from (3) in (6), $$n = \frac{(erf^{-1}(C))^2(1 - 4m^2)}{2m^2} \quad (7)$$

[where C & m∈(0, 1)]

Equation (7) shows the relationship between the maximum number of particles (n) that need to be analyzed, confidence level (C) and tolerance level (m). Since 'n' needs to be an integer, the results of equation (7) can be rounded up.

Figure 10:
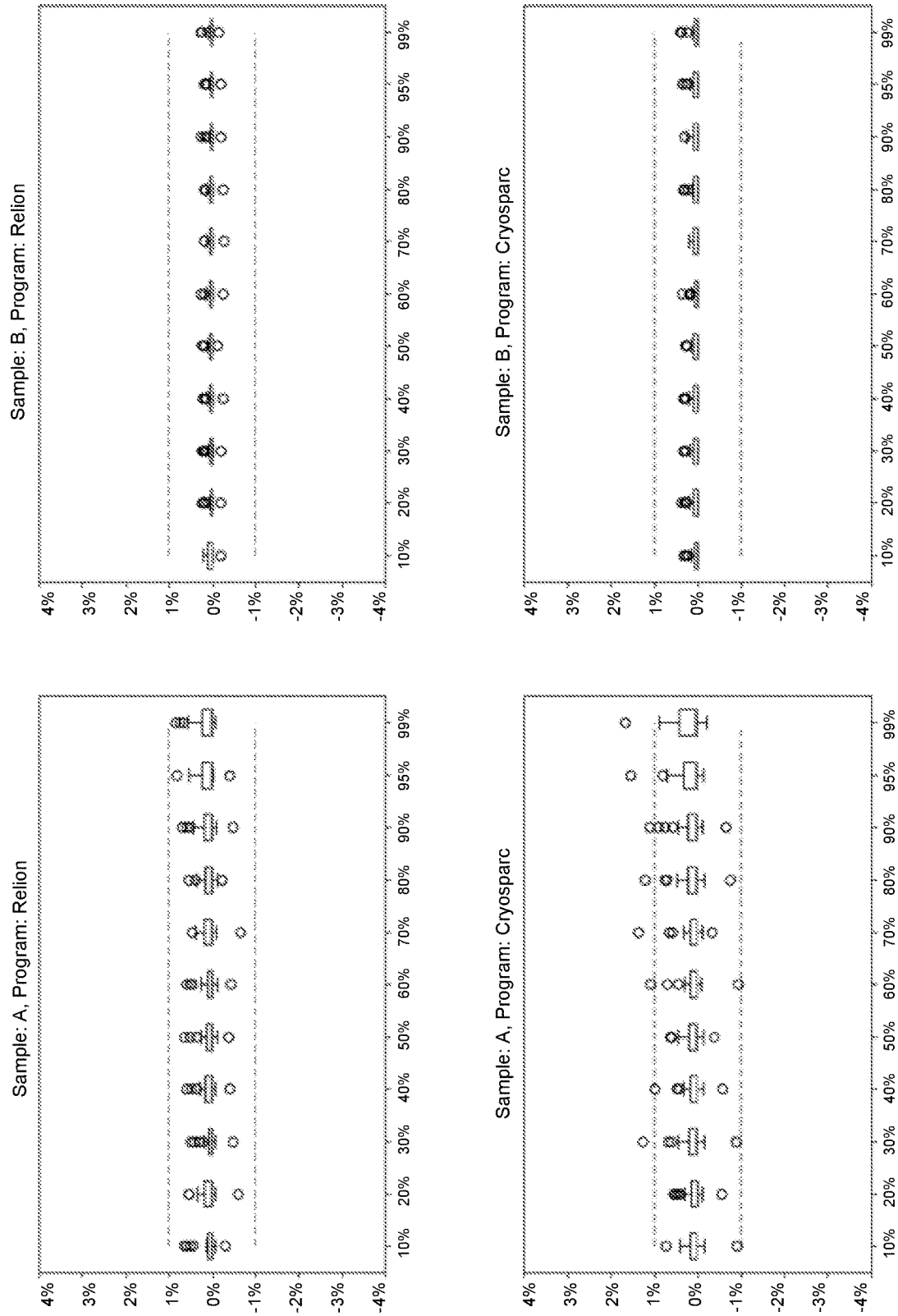
FIG. 10 shows a distribution of percentage difference between analytical and bootstrap estimates of lower confidence limit across different confidence levels (x-axis).
Figure 11:
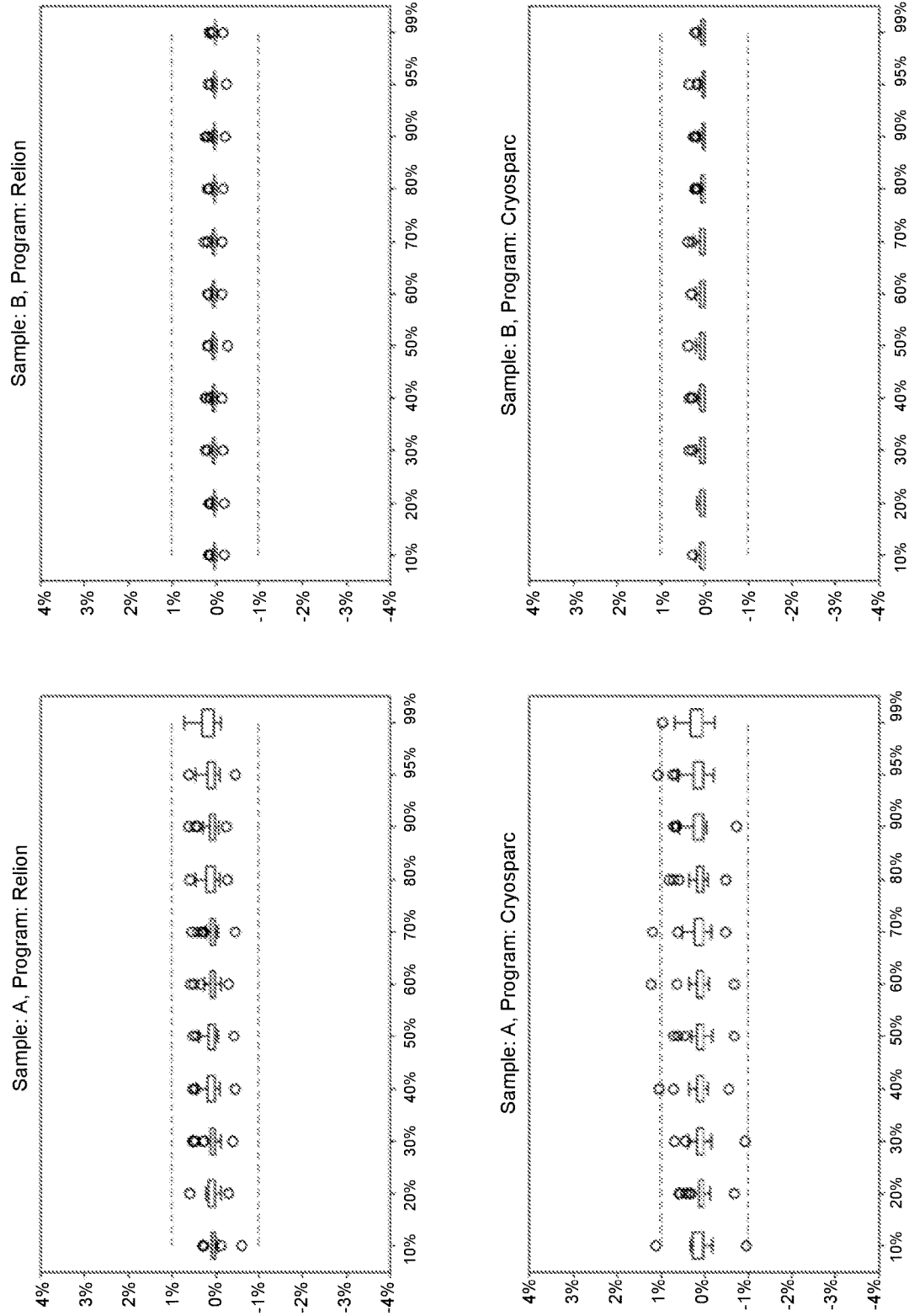
FIG. 11 shows a distribution of percentage difference between analytical and bootstrap estimates of upper confidence limit across different confidence levels (x-axis).

To validate the parametric model assumptions, confidence intervals were derived based on non-parametric bootstrap and compared them against the analytical confidence intervals given by (4). The bias-corrected and accelerated ($BC_a$) method of confidence interval estimation was used with 1,000,000 bootstrap replicates per experiment (sample and program combination). Each experiment had an analytical lower confidence limit and an upper confidence limit along with their bootstrap counterparts. To compare their correspondence, the percentage difference between both estimates for the lower and upper confidence limits was calculated separately across different confidence levels. FIG. 10 shows the distribution of percentage difference in the lower confidence limit for various confidence levels. Similar analysis was done for the upper confidence limit as shown in FIG. 11. High level of agreement was observed between the parametric and non-parametric estimates with most differences lying within the 1% range.

Table 4 shows results of the use of a multivariate least squares model to determine factors affecting the estimated percentage of full virus particles.

TABLE 4

| Source | N parameters | DF | Sum of Squares | F Ratio | Prob > F |
|---|---|---|---|---|---|
| Sample | 1 | 1 | 43914 | 2075.1 | <0.0001 |
| Program | 1 | 1 | 364 | 17.2 | <0.0001 |
| N particles | 1 | 1 | 26 | 1.2 | 0.27 |
| Sample * Program | 1 | 1 | 16 | 0.7 | 0.39 |

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

What is claimed is:

1. A method of estimating a proportion of particles filled with material, the method comprising:
    obtaining an image depicting a plurality of particles;
    generating a plurality of classes based on the plurality of particles;
    identifying at least one of the plurality of classes having a central portion with a greater density than a central portion of at least one other of the classes;
    determining a minimum number of particles in the plurality of particles to achieve at least one of a particular confidence level or a particular tolerance level;
    estimating a proportion of the plurality of particles that are filled with material based on identifying at least one of the classes having a central portion with high density; and
    providing an indication whether the plurality of particles is functional based on the estimated proportion of the plurality of particles having a central portion with high density.

2. The method of claim 1, wherein generating the plurality of classes further comprises:
    comparing each of the plurality of particles to a reference, and
    grouping each of the plurality of particles with one of the plurality of classes based on a degree of similarity to the reference.

3. The method of claim 2, wherein the plurality of classes comprises a plurality of class averages, and
    wherein grouping each of the plurality of particles with one of the plurality of classes based on the degree of similarity to the reference further comprises:
        grouping each of the plurality of particles with one of the plurality of class averages based on the degree of similarity to the reference.

4. The method of claim 3, wherein the reference is a reference image, and
    wherein grouping each of the plurality of particles with one of the plurality of class averages based on the degree of similarity to the reference further comprises:
        grouping each of the plurality of particles with one of the plurality of class averages based on the degree of similarity to the reference image.

5. The method of claim 4, wherein grouping each of the plurality of particles with one of the plurality of class averages based on the degree of similarity to the reference image further comprises:
comparing each of the plurality of particles against the reference image in each of a plurality of orientations, and
grouping each of the plurality of particles with one of the plurality of class averages based on the degree of similarity to the reference image based on comparing each of the plurality of particles against the reference image in each of the plurality of orientations.

6. The method of claim 5, wherein the reference image comprises a previously-determined class average of the plurality of class averages.

7. The method of claim 6, wherein grouping each of the plurality of particles with one of the plurality of class averages based on the degree of similarity to the reference image further comprises:
producing a weighted average of each of the plurality of particles having the degree of similarity to the reference image.

8. The method of claim 7, wherein identifying at least one of the plurality of class averages having a central portion with a greater density than a central portion of at least one other of the class averages further comprises:
identifying at least one of the plurality of class averages having an elevated radial density in the central portion compared to a radial density in the central portion of at least one other of the class averages.

9. The method of claim 8, wherein estimating the proportion of the plurality of particles that are filled with material further comprises:
determining a number of particles associated with each of the plurality of class averages, and
estimating the proportion of the plurality of particles that are filled with material based on determining the number of particles associated with each of the plurality of class averages.

10. The method of claim 2, wherein the reference comprises a three- dimensional reference model, and
wherein grouping each of the plurality of particles with one of the plurality of classes based on the degree of similarity to the reference further comprises:
grouping each of the plurality of particles with one of the plurality of classes based on the degree of similarity to the three-dimensional reference model.

11. The method of claim 10, wherein grouping each of the plurality of particles with one of the plurality of classes based on the degree of similarity to the three-dimensional reference model further comprises:
grouping each of the plurality of particles with one of the plurality of classes based on the degree of similarity to the three-dimensional reference model without imposing symmetry.

12. The method of claim 11, wherein identifying at least one of the plurality of classes having the central portion with a greater density than a central portion of at least one other of the class averages further comprises:
identifying at least one of the plurality of classes having an elevated radial density in the central portion compared to a radial density in the central portion of at least one other of the classes.

13. The method of claim 12, wherein estimating the proportion of the plurality of particles that are filled with material further comprises:
determining a number of particles associated with each of the plurality of classes, and
estimating the proportion of the plurality of particles that are filled with material based on determining the number of particles associated with each of the plurality of classes.

14. The method of claim 1, wherein obtaining an image depicting a plurality of particles further comprises:
obtaining an image depicting a plurality of particles imaged using cryo-EM.

15. The method of claim 1, wherein the plurality of particles comprises a plurality of virus capsids.

16. The method of claim 15, wherein the plurality of virus capsids comprise adeno-associated virus (AAV) capsids.

17. The method of claim 1, wherein the material comprises a material selected from the group consisting of: nucleic acid material, pharmaceuticals, organic compounds, and amino acid material.

18. The method of claim 1, wherein the material comprises genomic material.

19. A system for estimating a proportion of particles filled with material, the system comprising:
a memory in communication with a processor, the memory having stored thereon a set of instructions which, when executed by the processor, cause the processor to:
obtain an image depicting a plurality of particles;
generate a plurality of classes based on the plurality of particles;
identify at least one of the plurality of classes having a central portion with a greater density than a central portion of at least one other of the classes;
determine a minimum number of particles in the plurality of particles to achieve at least one of a particular confidence level or a particular tolerance level;
estimate a proportion of the plurality of particles that are filled with material based on identifying at least one of the classes having a central portion with high density; and
provide an indication whether the plurality of particles is functional based on the estimated proportion of the plurality of particles having a central portion with high density.

* * * * *